US011184234B2

United States Patent
Mahdi et al.

(10) Patent No.: US 11,184,234 B2
(45) Date of Patent: Nov. 23, 2021

(54) SELF-OPTIMIZING FABRIC ARCHITECTURE AND SELF-ASSEMBLING NETWORK

(71) Applicant: Ciena Corporation, Hanover, MD (US)

(72) Inventors: Kaniz A. Mahdi, Carrollton, TX (US);
Nigel R. Davis, Edgware (GB); Mahdi Hirab, Montreal (CA); Stephen B. Alexander, Annapolis, MD (US);
Sergio Slobodrian, Ottawa (CA);
David J. Krauss, Centreville, VA (US)

(73) Assignee: Ciena Corporation, Hanover, MD (US)

( * ) Notice: Subject to any disclaimer, the term of this patent is extended or adjusted under 35 U.S.C. 154(b) by 69 days.

(21) Appl. No.: 16/849,129

(22) Filed: Apr. 15, 2020

(65) Prior Publication Data

US 2020/0336376 A1 Oct. 22, 2020

Related U.S. Application Data

(60) Provisional application No. 62/834,499, filed on Apr. 16, 2019, provisional application No. 62/834,476, filed on Apr. 16, 2019.

(51) Int. Cl.
*H04L 12/24* (2006.01)
*G06N 20/00* (2019.01)
(Continued)

(52) U.S. Cl.
CPC ........... *H04L 41/0823* (2013.01); *G06N 5/04* (2013.01); *G06N 20/00* (2019.01); *H04L 41/16* (2013.01); *H04L 63/0272* (2013.01)

(58) Field of Classification Search
CPC .......... G06N 3/006; G06N 5/04; G06N 5/043; G06N 20/00; G06N 20/20; H04L 41/042;
(Continued)

(56) References Cited

U.S. PATENT DOCUMENTS 6,477,566 B1  11/2002  Davis et al.
6,819,668 B1  11/2004  Hackett et al.
(Continued)

OTHER PUBLICATIONS

S. Mollahasani, M. Erol-Kantarci, M. Hirab, H. Dehghan and R. Wilson, "Actor-Critic Learning Based QoS-Aware Scheduler for Reconfigurable Wireless Networks," in IEEE Transactions on Network Science and Engineering, doi: 10.1109/TNSE.2021.3070476. (Year: 2021).*

*Primary Examiner* — Kostas J Katsikis
(74) *Attorney, Agent, or Firm* — Clements Bernard Baratta; Lawrence A. Baratta, Jr.; Christopher L. Bernard

(57) ABSTRACT

A controller associated with a domain includes a network interface; one or more processors communicatively coupled to the network interface; and memory storing instructions that, when executed, cause the one or more processors to communicate with one or more additional controllers via the network interface, wherein each of the one or more additional controllers is in one or more additional domains, and wherein each domain provides different characteristics, utilize at least part of a control pattern to obtain requirements for a service, and cause, utilizing any of a peer relationship and a hierarchical relationship with the one or more additional controllers, at least part of implementation of a composition of resources to meet the requirements for the service, wherein the composition defines the resources provided in each domain for the service, and wherein the composition is based on the requirements and the different characteristics in each domain.

26 Claims, 25 Drawing Sheets

(51) Int. Cl.
*G06N 5/04* (2006.01)
*H04L 29/06* (2006.01)

(58) Field of Classification Search
CPC . H04L 41/0823; H04L 41/5054; H04L 41/16; H04L 63/0236; H04L 63/0272; H04L 63/20
See application file for complete search history.

(56) References Cited

U.S. PATENT DOCUMENTS

| | | |
|---|---|---|
| 6,990,517 B1 | 1/2006 | Bevan et al. |
| 8,141,115 B2 | 3/2012 | Wohlert et al. |
| 8,300,625 B2 | 10/2012 | Shew et al. |
| 8,687,593 B2 | 4/2014 | Madhi et al. |
| 8,799,495 B2 | 8/2014 | Wohlert et al. |
| 9,071,921 B2 | 6/2015 | Mahdi |
| 9,191,117 B2 | 11/2015 | Alexander et al. |
| 9,277,383 B2 | 3/2016 | Mahdi |
| 9,503,443 B2 | 11/2016 | Krauss et al. |
| 9,686,176 B2 | 6/2017 | Traxler et al. |
| 10,033,623 B2 | 7/2018 | Jain et al. |
| 10,187,318 B2 | 1/2019 | Cote et al. |
| 10,581,914 B2 | 3/2020 | Krauss et al. |
| 10,582,061 B2 | 3/2020 | Mahdi et al. |
| 11,134,025 * | 9/2021 | Billore .................... H04L 67/10 |
| 2003/0093551 A1 | 5/2003 | Taylor et al. |
| 2004/0062205 A1 | 4/2004 | Friskney et al. |
| 2009/0207807 A1 | 8/2009 | Mahdi et al. |
| 2009/0280810 A1 | 11/2009 | Mahdi et al. |
| 2011/0122867 A1 | 5/2011 | Hirab |
| 2015/0156059 A1 | 6/2015 | Shew et al. |
| 2015/0363240 A1* | 12/2015 | Koizumi ............. G06F 11/3447 718/1 |
| 2016/0301579 A1 | 10/2016 | Djukic et al. |
| 2017/0353246 A1 | 12/2017 | Frankel et al. |
| 2018/0324106 A1* | 11/2018 | Billore ................. H04L 47/822 |
| 2019/0230046 A1 | 7/2019 | Djukic et al. |
| 2020/0067935 A1 | 2/2020 | Carnes, III et al. |
| 2020/0259722 A1* | 8/2020 | Kocberber .......... H04L 41/5048 |
| 2021/0051060 A1* | 2/2021 | Parvataneni .......... G06N 3/006 |

\* cited by examiner

SELF-OPTIMIZING FABRIC ARCHITECTURE AND SELF-ASSEMBLING NETWORK

CROSS-REFERENCE TO RELATED APPLICATION(S)

The present disclosure claims priority to U.S. Provisional Patent Application No. 62/834,476, filed Apr. 16, 2019, and entitled "Self-optimizing fabric architecture," and to U.S. Provisional Patent Application No. 62/834,499, filed Apr. 16, 2019, and entitled "Self-assembling wireless networks via flying nodes," each is incorporated by reference in its entirety.

FIELD OF THE DISCLOSURE

The present disclosure generally relates to network architectures. More particularly, the present disclosure relates to a next-generation network architecture for connect, compute, sense, store, and act resources, and specifically a Self-Optimizing Fabric (SOF) architecture, a self-assembling network that utilizes the SOF architecture, and the like.

BACKGROUND OF THE DISCLOSURE

The network of tomorrow will be shaped by telco service providers (traditional network service providers), Global Content Networks (GCNs) (new, emerging cloud and Internet companies), and a new, third category of emerging providers for the Internet of Things (IoT) and the like. The IoT market has been evolving in an independent parallel path, separate from telco service providers and GCNs. Recent advances in machine intelligence and robotics have started to shape this industry in a way that is anticipated to affect all facets of our lives as it revolutionizes a multitude of industries. The fifth generation of wireless access, commonly known as 5G, is anticipated to revolutionize the user experience with increased bandwidth, extended reachability, and reduced latency. Unlike previous generations of wireless technologies, 5G represents a first opportunity for the telco service provider to extend its reach beyond mere connectivity. In parallel, the Cloud industry (GCNs) is shaping its pivot toward distributed computing, building compute resources closer to the user to support the localized creation, and consumption of data resulting from connected devices of the future (e.g., self-driving cars).

A 5G connected world is anticipated to be omni-connected, wherein lines are blurred between cyber-physical systems, humans, and machines; workloads processed locally or at a distance; and between consumers and producers of digital components and services. This world of a pervasive cloud will transcend both the conventional time boundaries as well as the spatial boundaries normally associated with distributed computing. A 5G connected world is essentially an ecosystem of interconnected intelligence systems. These systems will be vastly complex, intricately intertwined, vastly interactive with an order of magnitude larger information exchange than the current, and will evolve rapidly in directions that will be difficult (if not impossible) to plan, design, and operate using current paradigms. This complexity results from the inter-relationship, inter-action, and inter-connectivity of different intelligent components within a system (e.g., network nodes, access points, data centers, etc.) and between this system and its dynamic environment.

The conventional state of autonomous systems is rule and/or algorithmic-based with specialization for a particular domain. As described herein, the term domain denotes something (node, device, network, cloud, a combination thereof, etc.) that provides resources. The conventional state of the art includes single-agent systems that use simple regression techniques aiming for closed-loop control for network programmability with some degree of automation. They may differ in implementation, but all of them follow a simple close loop pattern of 'Connect→Sense→Act' to control a network element using telemetry interfaces and configuration knobs exposed via element management. These systems do not handle independent networks and are nowhere capable of controlling different networks (service providers, GCNs, IoT, etc.) in a 5G system.

Some solutions have emerged using Reinforcement Learning to solve special purpose optimization problems, e.g., video optimization over mobile networks. There is also some ongoing research on Federated Learning and Distributed Inference Systems, but all of these are targeting single-specialty domains, e.g., distributed image recognition.

Accordingly, there is a need for a next-generation network architecture for connect, compute, sense, store, and act resources, and specifically a Self-Optimizing Fabric (SOF) architecture. It does not make sense for three different network visions to evolve separately, i.e., telco, cloud, and IoT. That is, these markets will converge, blurring the distinction between telco service providers, Internet Content Providers (ICP), and the new breed of service providers that are emerging as the niche IoT market takes shape. As described herein, the notion of a 'Provider' is used to represent a provider of any valuable service in this converged marketplace, to avoid labeling network service providers in different categories (telco, cloud, and IoT).

A key challenge on the path to this convergence is the complexity that results from multi-dimensional variance: broad variance in service characteristics representing the three different extremes of the target services landscape (bandwidth, volume, responsiveness (latency)); traffic variance resulting from this disparate services landscape; and control variance resulting from heterogeneous governance of these services that span across the telco, cloud and IoT service providers. The key to the success of this convergence lies in preserving simplicity.

BRIEF SUMMARY OF THE DISCLOSURE

The present disclosure relates to a next-generation network architecture for connect, compute, sense, store, and act resources, and specifically a Self-Optimizing Fabric (SOF) architecture. Specifically, the present disclosure includes a federation of controllers that work together to deliver a service, across different domains, different providers, different technologies, etc. That is, the SOF architecture includes an arrangement of intricately intertwined, but "self-contained" intelligence components, systems, and fabrics that strive to dynamically organize and optimize itself, as these entities collaborate to deliver shared goal(s), while also serving their individual goal(s) which may be collaborative or competitive with respect to each other.

The SOF can be viewed as an assembly of heterogeneous components, systems, and fabrics contributed (with varying degrees of intelligence) by disparate producers (who may also be consumers), and consumers (who may also be producers), for an end-to-end intelligence fabric optimized to meet the overall objectives of business collaboration. The ultimate ambition with SOF is a fluid federation of self-organizing and self-optimizing entities that will dynamically discover, attach, and detach with their peer entities, contributing to the higher order of organization and optimization that emerges from this federation. Put simply, SOF aims to be an emergent 'fabric of fabrics' that is both self-organizing and self-optimizing.

The handling complexity of such a dynamically evolving arrangement becomes a critical challenge, requiring continuous optimization of resources overall timescales. This brings Plan, Design, and Operations into a seamless continuum. In this continuum, an optimal state is maintained by enabling a capable system to sense the current condition, discern its meaning in the broader context, infer the current/potential deviation from the desired outcome, decide an optimal course of action to best achieve desired outcomes, and finally, act on these decisions on an ongoing basis. An intertwining of heterogenous capable systems, each with appropriate intelligence exhibiting a typical control pattern of Sense, Discern, Infer, Decide, and Act, forms the genesis of a SOF.

In an embodiment, a controller associated with a domain includes a network interface; one or more processors communicatively coupled to the network interface; and memory storing instructions that, when executed, cause the one or more processors to communicate with one or more additional controllers via the network interface, wherein each of the one or more additional controllers is in one or more additional domains, wherein each domain has one or more resources including one or more of connect resources, storage resources, and compute resources, and wherein each domain provides different characteristics, utilize at least part of a control pattern to obtain requirements for a service, and cause, utilizing any of a peer relationship and a hierarchical relationship with the one or more additional controllers, at least part of the implementation of a composition of resources to meet the requirements for the service, wherein the composition defines the resources provided in each domain for the service, and wherein the composition is based on the requirements and the different characteristics in each domain.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
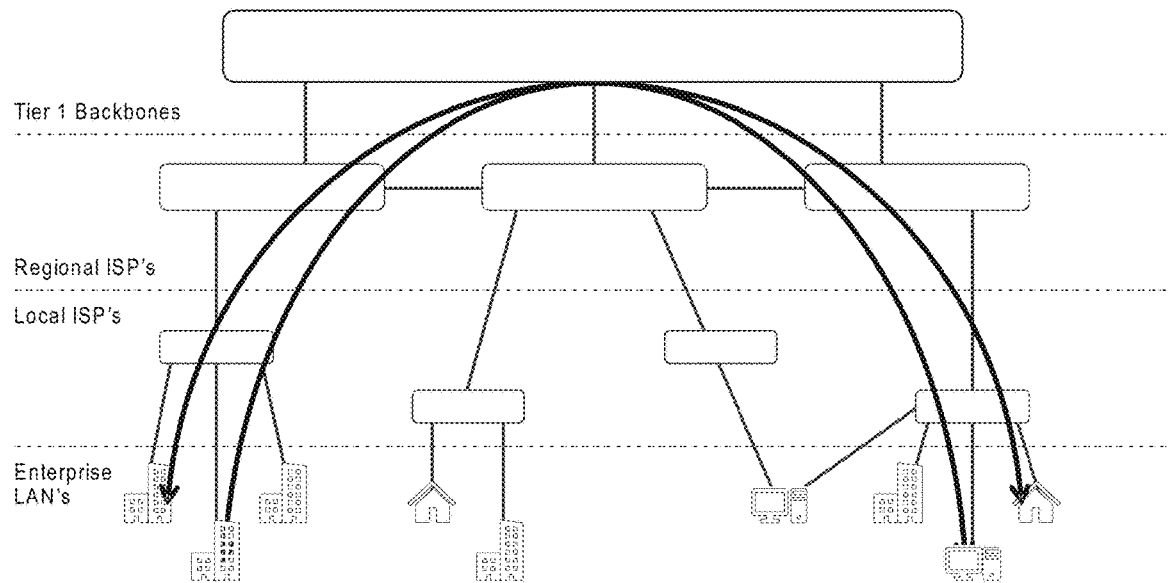
FIG. 1 is a network diagram of traffic flows across the early Internet.

In various embodiments, the present disclosure relates to a next-generation network architecture for connect, compute, sense, store, and act resources, and specifically a Self-Optimizing Fabric (SOF) architecture, a self-assembling network that utilizes the SOF architecture, and the like. To help preserve simplicity, the network architecture provides unification of the telco, cloud, and IOT market segments toward a so-called Pervasive Cloud, which is a hierarchical compute construct that stitches together disparate devices, and compute resources from heterogeneous systems in a fluid and dynamic hierarchy. With this approach, the underlying service delivery mechanisms are abstracted to such a level that the network becomes invisible to the user, the user being any user of the system, including an IoT Service Provider (SP), a Telco SP, or an ICP.

The network architecture includes a notion of a "pervasive" cloud, which is different from current cloud systems as follows. The pervasive cloud evolves the current cloud resource units of Compute, Connect, Storage, (with the cloud being a static construct of physical resources) to Compute, Storage, Connect (Networking), Sense, Act (evolving cloud to an intelligent dynamic construct, with 'Sense' and 'Act' elements providing the intelligence [adaptive/self-optimizing] and dynamism [fungible distributed compositions]). In essence, the cloud is adaptive, dynamic, and pervasive. The pervasive cloud is implemented with a federation of disparate entities in a hierarchical pattern (east-west interfaces for a federation of peers at the same tier of the hierarchy, north-south interfaces for client/server relationships across multiple tiers of hierarchy). A SOF (Self Optimizing Fabric) is an enabler for the implementation of the pervasive cloud.

Again, the network architecture with the SOF includes a combination of heterogeneous systems, each having intelligence providing a control pattern of Sense, Discern, Infer, Decide, and Act (SDIDA). A heterogeneous system (also referred to as an entity, a domain, etc.) can include a processing device, i.e., a controller, configured to perform this intelligence pattern. An example of such a collaboration of multiple intelligence entities which may have competitive or collaborative individual goals is an optimization of street traffic performed with the collaboration of Autonomous Vehicles (AV) and Autonomous Traffic Control (ATC) system wherein each AV is driven by its respective objectives (e.g., as per AV manufacturer, AV user policies, etc.), while the AV also contributes to the broader objective of optimizing the street traffic while collaborating with other AVs and the ATC. Note that while the overall outcome of this symbiosis is expected to be collaborative, i.e., a common objective of optimizing the street traffic, any pair-wise interaction of an AV-AV or AV-ATC combination may be competitive or collaborative.

In another embodiment, a network architecture includes one or more networks configured to provide a plurality of connect resources, compute resources, and store resources; one or more processing devices configured to implement sense resources and act resources; and a plurality of controllers associated with the connect resources, the compute resources, the store resources, the sense resources, and the act resources, wherein one or more dynamic compositions are configured in the one or more networks, via the plurality of controllers to provide a self-optimizing fabric, and wherein a dynamic composition includes a composition of disparate resources of the connect resources, the compute resources, the store resources, the sense resources, and the act resources which is created on demand for a user.

The plurality of controllers can be connected via east-west interfaces, which are peer relationships and north-south interfaces, which are client-server or master-slave or hierarchical relationships. The interfaces between the plurality of controllers can be configured with latency based on associated applications. The one or more networks can include a plurality of networks, from different providers and with disparate devices, and the plurality of controllers are configured to aggregate the disparate resources from the different providers and via the disparate devices. The self-optimizing fabric is a logical representation of the disparate resources stitched together with open Application Programming Interfaces (APIs), shared information models, and common algorithms. The disparate resources can include any of physical resources and virtual resources.

The proposed transformations to Software Defined Networking (SDN) and the Cloud enable adaptive systems implemented with dynamic compositions that are created on-demand, with minimal resources that are contributed by heterogeneous sources, and optimally placed to match the needs of the service(s) that they provide. Such compositions will rely on advanced machine learning techniques that enable adaption to external and internal change stimuli, exhibiting adaptable (external) and adaptive (internal) behaviors, respectively. Autonomics (self-governing, self-managing, etc.) is foundational to tame the complexity associated with such heterogeneous compositions. The network architecture includes a Self-Optimizing Fabric (SOF) to underpin the autonomic design, creation, and control of dynamic compositions. SOF is a modular construct that employs connect, compute, sense, store, and act value components, as crucial building blocks for dynamic compositions. With this approach, it is possible to enable any service offering using a combination of one or more of the five elements (sense, store, connect, compute, and act), with connect being the element that provides the fabric (the glue) that brings it all together.

An observation here is that the Telco Service Provider is currently able to monetize only $\frac{1}{5}$th of this value pie with their service offerings, i.e., 'Connect.' On the contrary, the ICP is well-positioned to monetize as much as $\frac{4}{5}$th of this value pie in the near future, if not today. Take, for example, the case of a mapping application that currently offers 'Sense,' 'Compute,' and 'Store;' the addition of self-driving cars will bring in the Act piece, raising the mapping application's share of this value pie to $\frac{4}{5}$th. With the rich user landscape being shaped by 5G, the Telco Service Provider has a unique opportunity to scale its share of the value pie to beyond just the 'Connect' element.

The essence of the network architecture described herein is, with the benefit of Pervasive Cloud underpinned with Self-Optimizing Fabric, a user (e.g., an autonomous vehicle manufacturer, an IoT device provider) will be able to assemble a solution to match their business needs, e.g., farming, pharma, healthcare, manufacturing, with a seamless composition of resources. Some may own resources, and some resources may come from a Telco Service Provider, and other resources from the various Cloud providers. Note, again, as described herein, the general term of provider is used herein to denote any service provider offering a service. This is used to remove the distinction between telco, cloud, IoT, etc. providers.

As with many dynamic systems, rapid adaption to the changing environment will determine whether a provider flourishes or perishes. Those providers that continue to provide the same services, that simply perpetuate the status quo, will find their services (and their value) undifferentiated and commoditized. On the other hand, those providers with adaptive offerings will flourish. The industry is rife with examples of companies that failed to adapt, and those that innovated and succeeded.

Network Evolution

Figure 2:
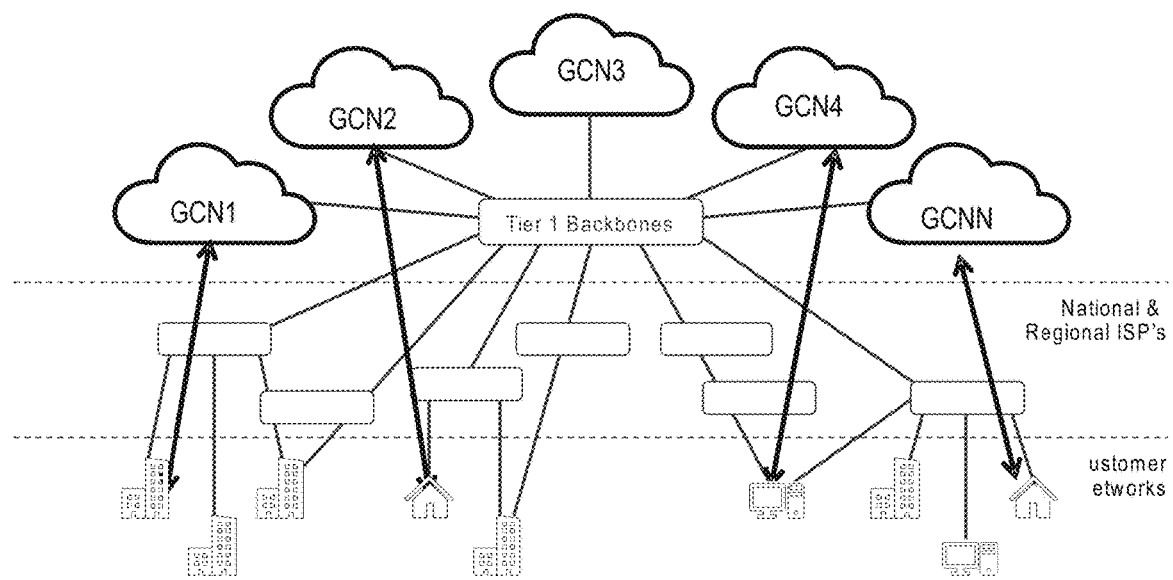
FIG. 2 is a network diagram of a restructured traffic flows on the Internet circa 2010 where a relatively small number of providers emerged as the most popular destinations on the Internet.

Since its commercial emergence in the 1990s, the Internet has experienced universal worldwide adoption. The Internet was originally a "network of networks," interconnecting a disparate group of networks that were typically owned and operated by different entities. A view of traffic flows across the early Internet is illustrated in FIG. 1. The last decade has seen the development of exceptionally successful Internet-based business models. By 2010, a relatively small number of them emerged as the most popular destinations on the Internet, thereby restructuring traffic flows significantly, as illustrated in the FIG. 2. These companies understood that their customers were not constrained by typical geopolitical boundaries. They reached their customers via web pages, content download, and apps, and their customer base could be as broad as the global Internet reach.

The OP" vision described herein was heavily influenced by the implications of these revised traffic flows, the massive growth that these Web-Scale companies were experiencing, and the expectation that the scale-out of Internet-based services and business models would continue. The key concepts contained in the OP" architecture were:

A) Complex network functions would be centralized, then progressively disaggregated, and finally virtualized. These functions are known today as Virtual Network Functions (VNFs).

B) The Carrier Central Office would become a "Content-Center." This is a facility that would both contain the classic content that users were creating and accessing (data, videos, music, text, etc.), and the VNFs that implement most of the required network functions. This facility has the same structure as a data center where there are significant quantities of fungible general-purpose compute and store resources available for a variety of users.

C) The Internet would evolve to support two principal types of connections: 1) Users consuming or originating content would be using the network for user-to-content (U2C) connections, and 2) Content is then distributed and replicated among various content centers using content-to-content (C2C) connections.

D) The cost of carrying traffic increases the higher up in the protocol stack (OSI stack) that one goes. Flows that do not require higher layer processing at intermediate nodes should transit these nodes; the traffic should be left at the lowest layer for as long as possible.

Industry initiatives have introduced similar concepts. ETSI began work on defining VNFs, the Open Networking Foundation (ONF) was created, SDN became a widely used term to describe programmable networks, and service providers transformed their infrastructure using SDN and Network Functions Virtualization (NFV) techniques.

Going forward, the Internet will continue its global growth with an expanding role. Video now makes up the majority of traffic, and the emergence of personal 4K and 8K video streams will only serve to increase egress capacities. Augmented Reality (AR) and Virtual Reality (VR) will explode both egress and ingress traffic, and ingress traffic from users (live streaming, for example) and IoT devices (sensors, vehicles, etc.) will tend to balance traffic to and from the network. And finally, the majority of the connections at the edge will be wireless.

The advent of the fifth generation of wireless access, commonly known as "5G," is anticipated to be revolutionary in many aspects. An Order of magnitude increase in bandwidth, extended reachability, and ultra-low latency afforded with 5G will usher in an era of pervasive networking that enables connectivity anywhere and anytime, to anyone and anything. This will, in turn, unlock new business avenues for the Telco Service Provider, extending its reach beyond mere connectivity.

This new wave of pervasive connectivity enables pervasive automation as machine learning techniques (which are being applied to robots, smart devices, and the like) evolve from simple regression to deep neural networks, revolutionizing all facets of our lives and a multitude of industries. A smart device has the processing, sensing, programming, and communication ability to function autonomously, semi-autonomously, or under the direction of network-based applications. The confluence of pervasive connectivity with machine intelligence will result in swarms of self-driving devices generating massive volumes of data dictating the need for distributed topology-aware compute and intelligence processing, ultimately shifting the traffic density toward the Access Edge.

Likewise, more and more content and associated computational capabilities will migrate towards the edge. In general, the content will become more localized, and the majority of traffic flows will occur over shorter distances. The Access Edge will become the key battleground. To maintain relevance, traditional Telco Service Providers must exploit their localized facilities for this distributed compute model to capture a large share of the emerging markets (e.g., connected car, smart city, IoT, and Industrial Internet) before the emerging companies seize these opportunities.

To summarize, wireline and wireless access will provide equally high bandwidth, reachability, and performance, enabling seamless access for humans and machines, ultimately leading to pervasive connectivity. The confluence of pervasive connectivity with machine intelligence will result in traffic patterns unthinkable with current systems, challenging the current norms of designing and operating communications networks. Elements of this pivot are:

The rise of the smart device, leading to what is characterized as self-driving 'device swarms,' anything that can be connected to a network will become a 'smart' thing.

Access unification will allow for a uniform way to connect things, and most things will be connected wirelessly.

The need for new functional elements that enable the collection, monitoring, and accumulation of sensor data, as well as processing and dissemination of control information.

The need for distribution of compute resources that allow sensor 'data' to be processed locally into 'information,' and then into 'Knowledge'; and finally, into 'Wisdom' when churned with global context over a sustained period of time; the broader the data set, the deeper the wisdom discerned.

Future systems must evolve toward a hierarchical model that allows for data collection, monitoring, and intelligence processing to be seamlessly distributed across a time and geography continuum as dictated by the latency and performance characteristics of the respective services being delivered. Referring to geographic (location) and time distribution of intelligence, as will be described later, dynamic compositions are based on prevailing user demand and are implemented using physical distributions of intelligence that meet the control demands of user traffic or applications.

Several industry efforts are currently underway to address this space (e.g., Central Office Re-architected as a Datacenter (CORD), European Telecommunications Standards Institute's Multi-access Edge Computing (ETSI MEC), Open Edge Compute (OEC)) as driven by the evolving needs of different market segments involved (i.e., Telco, Cloud, IoT). New technologies are being developed that range from Compute and Intelligence capabilities residing on a mobile user device (e.g., vehicle, handset, etc.); to those located in a home (e.g., home automation appliance); in an enterprise (e.g., local service network); at the Cell Tower, or a Central Office. What's needed is a convergence of traditional Telco, Cloud Data Center, and IoT systems toward a hierarchical compute construct that is characterized herein as the Pervasive Cloud.

Definitions

Controller—a processing device that implements the intelligence providing a pattern of Sense, Discern, Infer, Decide, and Act (SDIDA). Each controller is associated with (i.e., contained in, connected to, etc.) a domain. The controller can communicate with devices via various techniques, including open APIs, shared information models, as well as proprietary techniques. Devices can include, without limitation, network elements, other controllers, client devices, user equipment, etc. That is, devices can be anything that is controllable for providing resources. A controller has sense and act functionality over a set of resources, and works together with other controllers for creating compositions of resources that expand beyond the domain.

Domain—any device, network, cloud, multiple devices, etc. that provide resources such as connect (networking) resources, storage resources, and compute resources. Ultimately, the resources are used to provide a service to end-users, machines, etc. A domain can be a fluid construct, in addition to a static construct. For example, a domain may include a data center, a cloud, a network, or even a single device or network element.

Federation—an interconnection of multiple controllers in any of a peer relationship (East-West (E-W)) and a hierarchical relationship (North-South (N-S)), where the multiple controllers work together, each with their intelligence, to provide some goal such as in terms of services.

Provider—an entity that provides any valuable service with any resources, as the network evolves as described herein, a provider can be in any of the different categories (telco, cloud, and IoT).

Resources—compute, storage, sensing, and/or networking resources.

Services—broadly—anything that is provided via the resources. Non-limiting examples of services include voice, video, live streaming, telemetry, connecting devices, etc. It is expected that service offerings will continue to expand, and all such expansions are contemplated herein.

SOF—the SOF is a term utilized to denote the combination of the controllers in a federation controlling the domains to provide the services. A SOF is a fluid formation of controllers implementing control patterns and has no boundaries.

Pervasive Cloud

Figure 3:
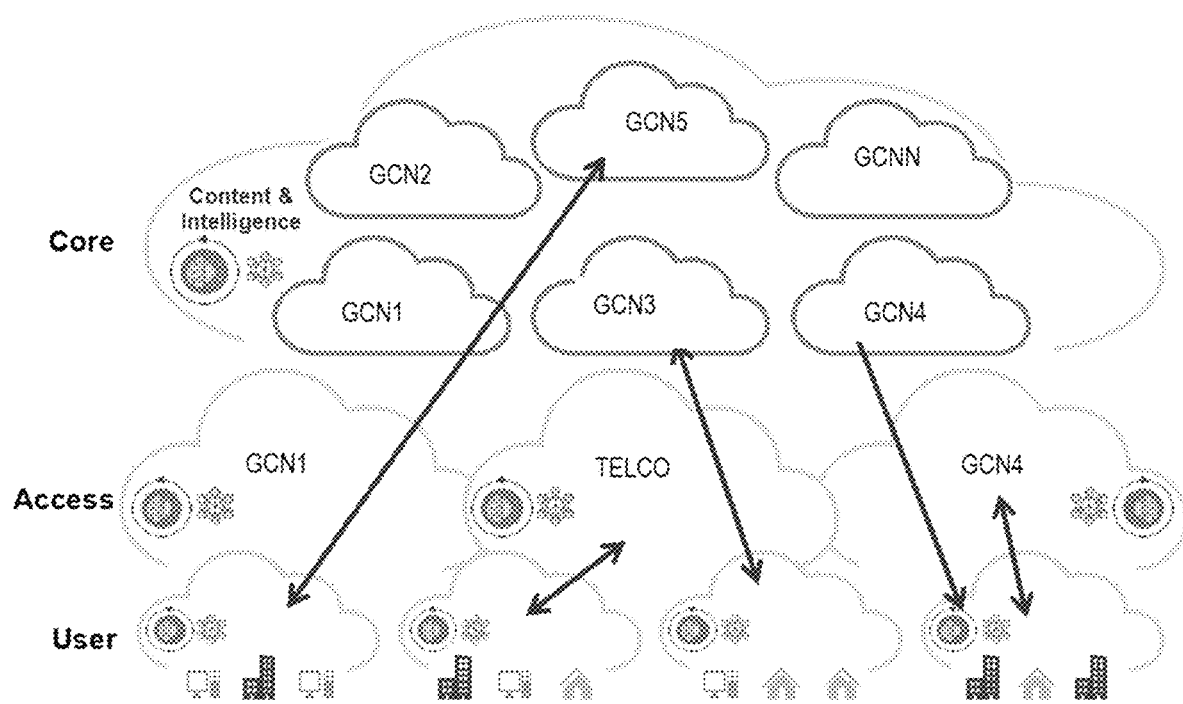
FIG. 3 is a network diagram of the Pervasive Cloud.

FIG. 3 is a network diagram of the Pervasive Cloud. The Pervasive Cloud is a hierarchical compute construct that stitches together disparate devices (disparate as used herein means different device types, different vendors, etc., namely devices that are generally not controlled together today), and compute resources from heterogeneous systems in a fluid and dynamic continuum. The key to the optimal design of such hierarchical systems is the distribution of information with an increasing degree of 'Intelligence' as the data flows toward the provider core, all the while conserving system resources. This entails stitching together heterogeneous cloud systems (that are governed by disparate jurisdictions) in a seamless hierarchy, as illustrated in FIG. 3.

An implication here is that distinctly different control systems can be stitched together with east-west (E-W) (peer relationship) and north-south (N-S) (client-server or master-slave relationship) interfaces to enable a cohesive user flow that distributes intelligence based on the respective service latency budget requirements (e.g., a 1 ms control loop is needed for real-time control of services, a 10 ms control loop is required for apparent instantaneous response to human users). This, in turn, results in a hierarchy for control systems distributed across a particular geographical span. These relationships (as defined with necessary levels of abstractions) allow for each of the contributing control systems to govern their respective jurisdictions with local policies, while these local policies are federated against global business rules pertaining to the service(s) being delivered collectively by these control systems.

Figure 4:
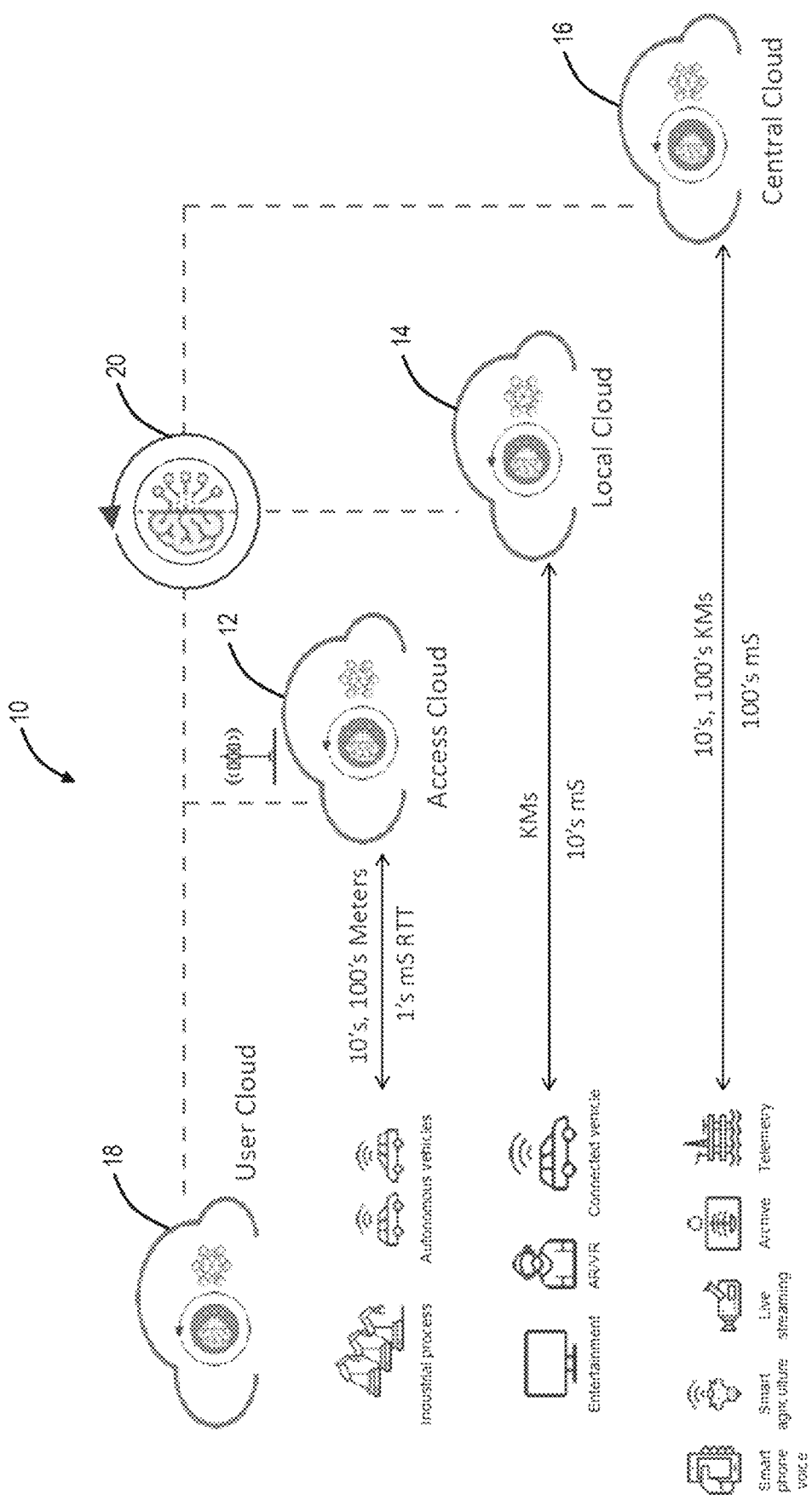
FIG. 4 is a network diagram of an example control system hierarchy.

FIG. 4 is a network diagram of an example control system hierarchy 10, with a cloud continuum stitching together multiple jurisdictions across a geography and time hierarchy. The hierarchy 10 includes, for example, three domains, including an access cloud 12, a local cloud 14, and a central cloud 16, communicatively coupled to a federation of controllers 20. There can further be a conceptual user cloud 18, which includes various end-users of services. As described herein, end users can be people with associated user devices (smartphones, tablets, computers, smart devices, IoT devices, streaming devices, etc.) as well as non-human end-users such as machines (IoT, smart cars, industrial devices) and other services. The hierarchy 10 includes hierarchical compositions that are end-to-end functional stacks of disparate systems that are dynamically chained together to serve a particular user segment, just as Internet Protocol (IP) services are stitched together in an IP service chain as specified by IETF Service Function Chaining.

For example, the end-users obtain the corresponding services from the domains, the clouds 12, 14, 16, and each cloud 12, 14, 16 have different characteristics. In this example, the characteristics are illustrated as latency and distance. The access cloud 12 has short distance—10, 100's of meters, and ultra-low latency (ms Round Trip Time (RTT)). The local cloud 14 has a greater distance (kilometers) and latency (10's ms RTT). Finally, the central cloud 16 has a greater distance (10-100s of kilometers) and latency (100's ms RTT). A simple example of a service may include autonomous vehicles. Here, latency is critical, and the controllers 20 need to ensure such requirements are met in the clouds 12, 14, 16. Another example is video streaming. Here, latency is less important, as is storage capacity.

The controllers 20 are configured to provide hierarchical compositions to meet the requirements of the services. Some hierarchical compositions include:

Distribution of Intelligence with control loops staggered across a geographical and latency hierarchy resulting in a 'distributed service chain' that caters to a varied degree of service requirements (e.g., throughput and latency).

A flexible design of control systems with the aggregation of functional components as dictated by the services offered by the end-to-end functional stack residing at a particular compute site.

Federation of heterogeneous jurisdictions that may be involved in a distributed service chain.

With this approach, the underlying service delivery mechanisms are abstracted to such a level that the network becomes invisible to the user (the user being any user of the system, including an IoT SP, or a Telco SP, or an ICP). The intent is to tame complexity using the principles of abstraction. However, complexity exists in reality, and techniques proposed herein can be employed to manage this. There are several challenges that can be overcome to implement the pervasive cloud, managing complexity being the most formidable.

Managing Complexity

Figure 5:
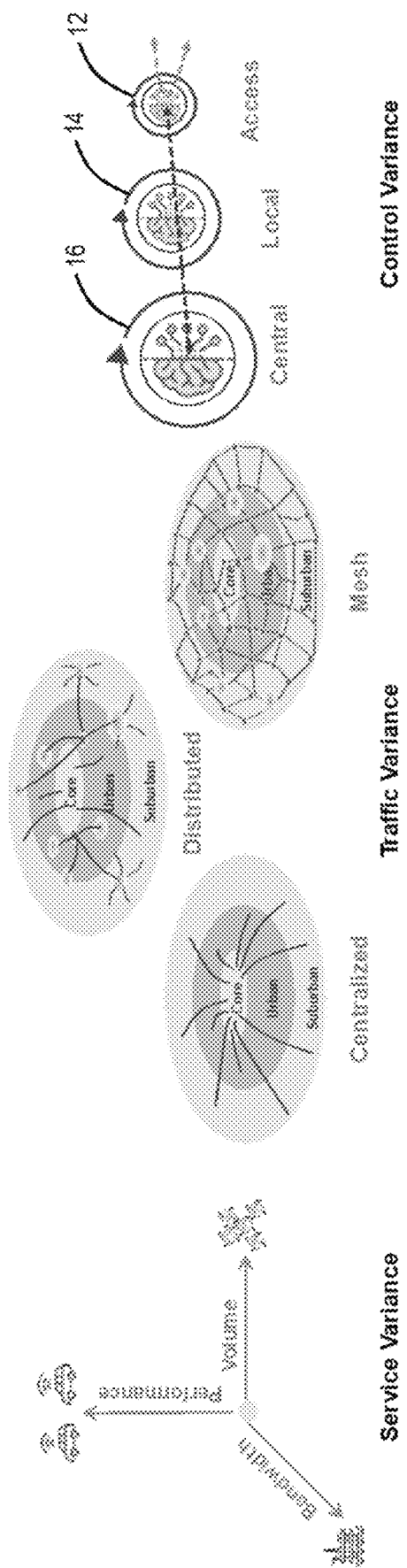
FIG. 5 is a diagram of the multi-dimensional variance anticipated with the Pervasive Cloud.

To date, the Access, Cloud, and IoT market segments have developed relatively independently, making significantly different architecture and technology choices along the way as driven by individual market needs. The confluence of these distinct segments incurs significantly higher complexity due to the multi-dimensional variance of services, traffic, and control (FIG. 5 is a diagram of the multi-dimensional variance anticipated with the Pervasive Cloud). As described herein, the multi-dimensional variance relates to the different characteristics in each of the clouds 12, 14, 16. That is, these domains all have different characteristics such as latency, cost, bandwidth, and the like.

For service variance, trying to assess 5G, the user scope seems rather complex-nothing close to the simple patterns of today, which are structured around human communications and entertainment. 5G serves three different extremes:

Extreme Broadband: order(s) of magnitude higher end-user data rates (10×-100× higher data rates); low latency, extreme coverage.

Massive Machine Type Communications: a massively large number of devices (10-100× more connected devices), with the order of magnitude higher mobile data volumes (1000× more data volumes); ultra-dense coverage, small payloads.

Ultra-Reliable Low Latency Communications: extremely high reliability and availability, ultra-low latency (10× lower latency).

For traffic variance, current networks are configured for user-to-content traffic with the centralization of data in content centers located in metro and rural areas. Internet access points and cache locations placed closer to the points of content consumption often result in better content delivery efficiency. This is a perfectly sound model for content delivery with the effective use of capacity over the metro and long-distance backbones, and low latency between users and content processing locations. However, both the nodal interconnection and computational positioning aspects of this model are challenged by the ultra-low latency control expected with 5G and the order of magnitude higher volumes of data exchange expected with IoT.

Architectures such as CORD and Edge data centers help to bring content and services closer to the user for improved performance. However, their level of distribution is not sufficient, and it is necessary for content to be distributed even deeper/closer to the edge to address the requirements of many high capacity and low latency services. Mobility presents an additional challenge as the service or application host point must move with the user to maintain consistent service performance, particularly for low latency control. Future traffic patterns are expected to evolve with increasingly rich connectivity at each step, from the centralized environment of today to the distribution patterns of CORD and Edge DC's, and ultimately toward meshed connectivity to support the complex user environment.

For control variance, the distribution of Intelligence is a challenge for networks, which serve a multitude of disparate autonomic systems. Autonomics in the context of automated management has been researched in academia with selective industry participation for over a decade now—a handful of industry initiatives have just recently started to study the practical challenges that stand in the way of real-world implementations. Nevertheless, this area remains rife with open research challenges. Key among these challenges are placement and federation of control loops for a robust control hierarchy, and data ownership and federation across multiple control jurisdictions.

The key to designing systems faced with such multi-dimensional variance is in preserving simplicity while enabling extreme flexibility, hence the need for a new design paradigm that enables ultra-lean modular systems.

Network Direction

Networks must become adaptive to compose lean systems that maximize extensibility. This must be done with minimal redundancy and to minimize hardware and software dependencies. SDN, with its aim to separate control plane and user plane functions, is an essential first step to enabling data plane programmability. SDN has proved to be a game-changer as it has helped to establish concrete proof points that the control plane and the data plane can be separated, and that it is possible to use external programmatic controls. NFV is also a step toward the application of SDN in the telecommunications environment. However, the straight virtualization of monolith gateways is not the answer. It is not effective when closed proprietary controls remain preserved, merely transitioning from a physical to a virtual implementation of the same closed function.

Enabling effective programmatic control includes the ability for an external system to control the various applications contributing to a particular user flow. Current brownfield telco applications do not easily allow such externalized control. Although current Element Management Systems (EMS) allow for some degree of observability and externalized configuration, the actual control of the application resources remains closed as proprietary implementations inherent within the application persists. The EMS is a protector that needs to be lifted up to allow the fluid exchange of observability and control information, a bi-directional exchange that needs to occur between the controller and the controlee.

Figure 6:
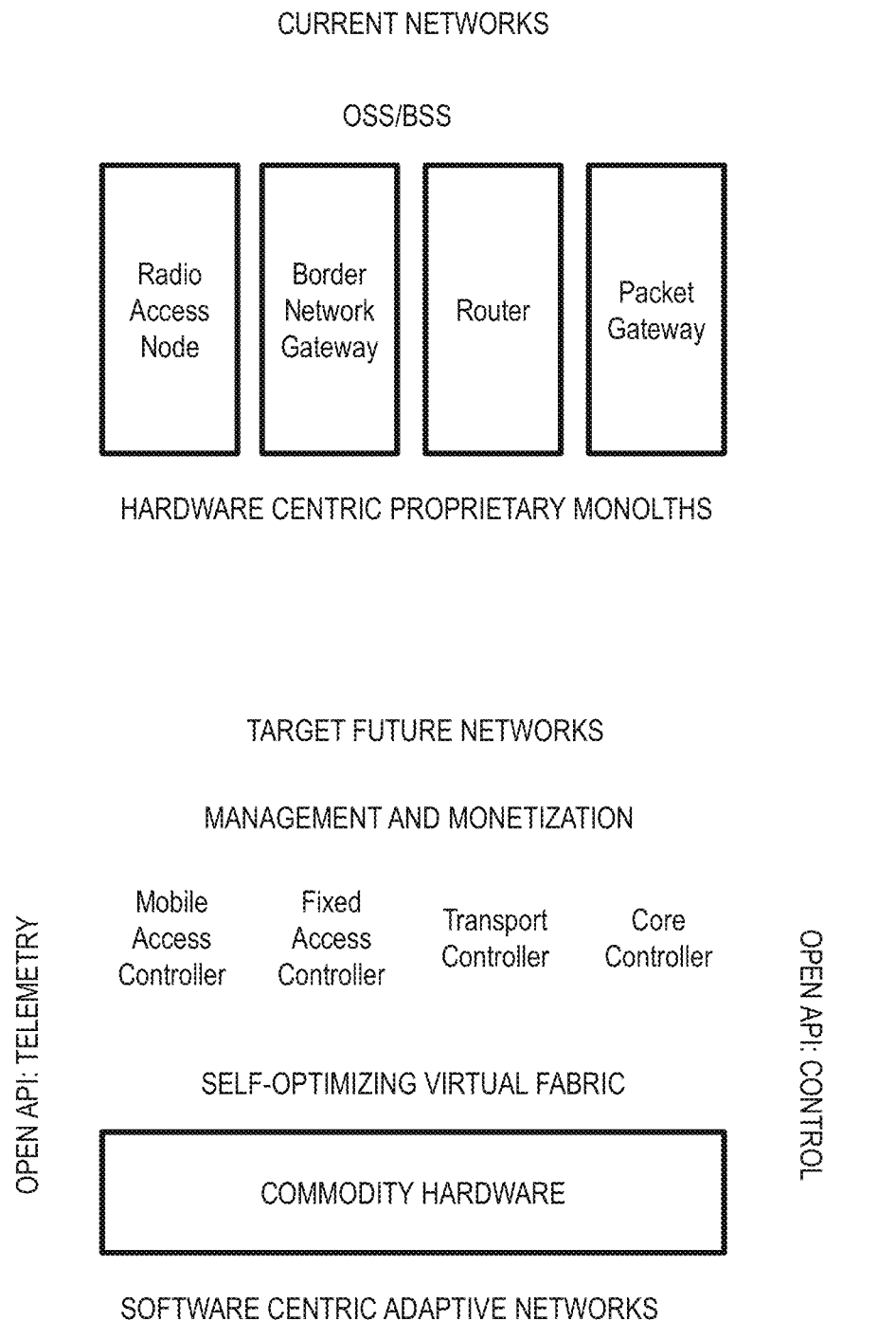
FIG. 6 is a diagram of a transition to a future network from a current network.

Providers are seeking a clean slate approach that replaces the current monolithic routers and gateways with Control Applications. These applications drive specific control behaviors through a southbound API exerted on a common data plane fabric, as illustrated in FIG. 6, which is a diagram of a transition to a future network from a current network.

Creating a user-flow would then be a matter of stitching together these Control Applications with east-west and north-south interfaces. The Control Applications are controllers tightly coupled to the data plane capabilities and resources applicable to the domain they serve. For example, as illustrated in FIG. 6, a Mobile Access Controller would provide functions similar to a Radio Access Network (RNC) control plane; a Fixed Access Controller would provide functions similar to Broadband Network Gateway (BNG) control plane, and a Core Controller would provide functions similar to the control plane of a Serving Gateway and a Packet Gateway in an Evolved Packet Core.

Network slicing is a good approach to enabling multi-tenancy on traditional telco systems where multiple users share the same system. However, it is not sufficient to support the multi-tenancy in the Pervasive Cloud model. What is needed is to support multiple users across multiple systems. This requires the ability to compose offerings using heterogeneous and geographically distributed resources, often even owned and operated by different governing entities. In other words, what's required is 'aggregation of resources from disparate providers' rather than 'segregation of a network owned and operated by a singular provider.'

Figure 7:
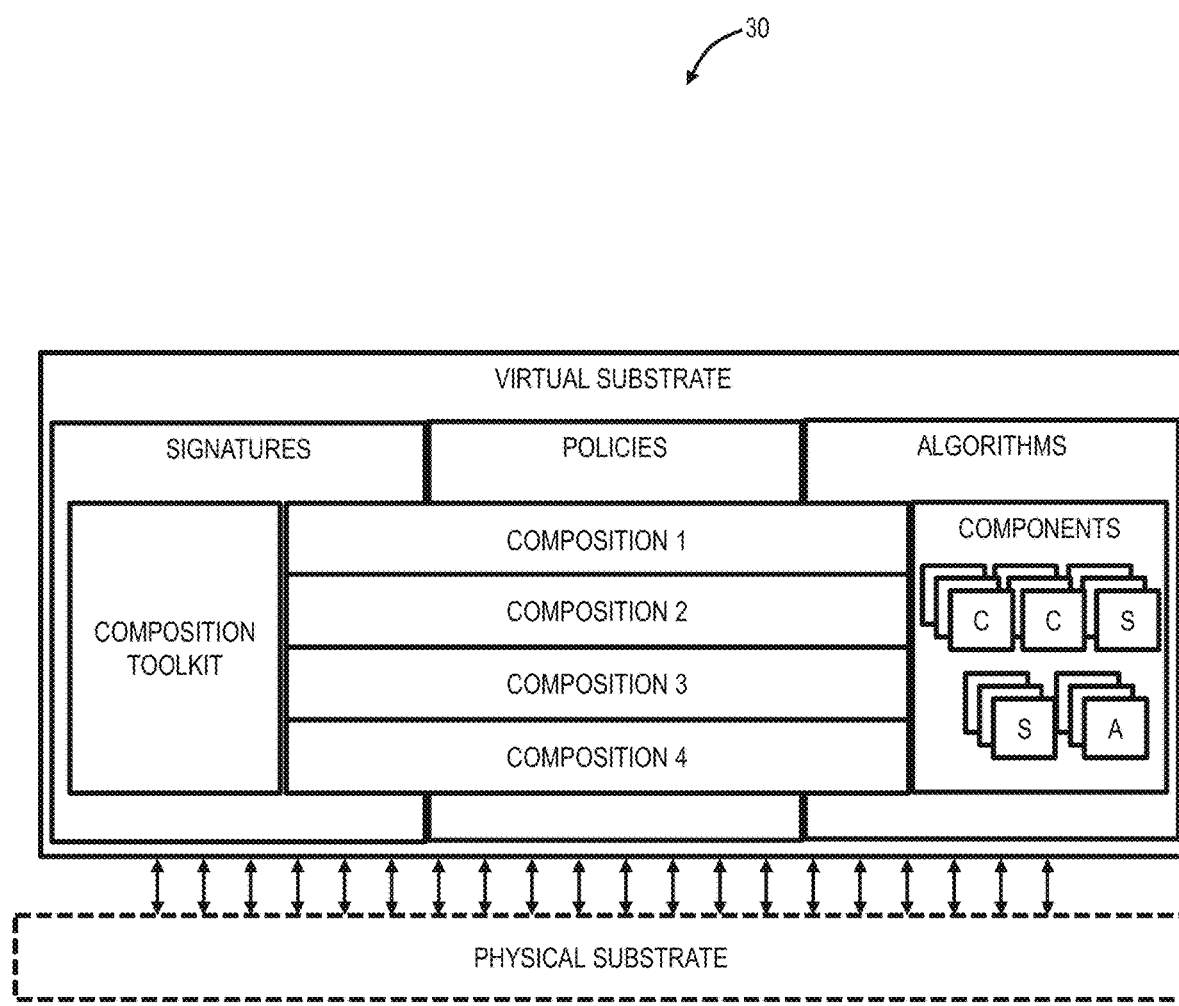
FIG. 7 is a diagram of dynamic compositions.
Figure 8:
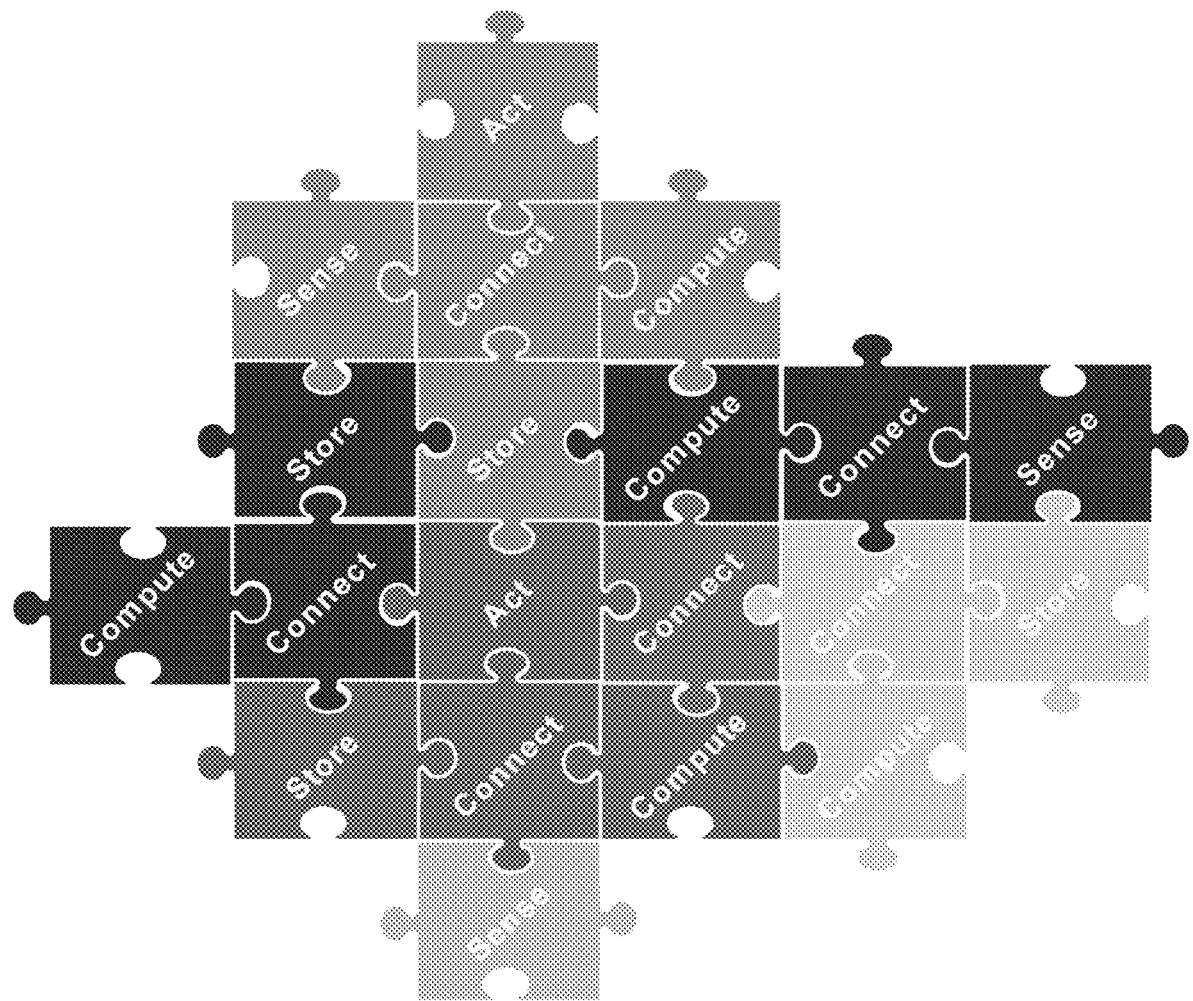
FIG. 8 is a diagram of a modular connect, compute, sense, store, and act construct (referred to as CCSSA) for the realization of such dynamic compositions.

To enable such aggregations, network slicing is extended toward dynamic compositions, i.e., compositions of disparate resources that are created, such as on-demand, as illustrated in FIG. 7 which is a diagram of dynamic compositions. The dynamic composition includes disparate resources that are created on-demand with minimal components placed to match the needs of the service(s) that they provide. The dynamic composition continuously adapts to change stimuli, exhibiting adaptable, and adaptive behaviors. A physical substrate is a collection of physical assets hosted at Cloud Provider's Data Centers, Access Data Centers, and User Compute. These could, for example, include compute cores, storage, or transmission medium contributed to by disparate sources. A virtual substrate is a virtual view of the substrate presented to the user of the shared system for the creation and adaptation of dynamic compositions. These will include minimal functional components optimally placed to match the needs of the service(s) that each composition provides (shown in FIG. 8). FIG. 8 is a diagram of a modular connect, compute, sense, store, and act value construct for realization and monetization of such dynamic compositions. Such compositions continuously adapt to external and internal change stimuli, exhibiting adaptable (external) and adaptive (internal) behaviors.

The dynamic compositions are an evolution of the network slicing concept. These include minimal functional components placed to match the needs of the service(s) that each composition provides. Such compositions continuously adapt to external and internal change stimuli, exhibiting adaptable (external) and adaptive (internal) behaviors. SOF is supported by physical assets distributed across the network and User Compute. SOF partitions and functionality is planned and designed using an Innovation Development Platform (IDP). The IDP operates at the intent level, abstracting the nuances of design and operation from users, as it translates intent into specific dynamic composition functionality. The IDP determines the initial state of the partition, including component distribution and connectivity, using the Composition Toolkit and Functional Component libraries. Artificial Intelligence can be applied to further enhance the dynamic composition, creating a self-optimizing fabric, as a knowledge base is developed, and user needs are updated. Each composition operates as if the user owns and operates its own cloud.

Resource elements may be implemented as a singular entity, or as a composition of two or more singular or composite entities, employing principles of recursion.

Provided below are key definitions for the resource elements:

Connect provides a conduit between two or more entities. It can be implemented as a physical networking device (e.g., the entity in the middle of the fabric in FIG. 8), or it can be composed of multiple components (various composite entities in FIG. 8, e.g., the entities could be two different connectivity slices). Note that Connect is included in compositions in that it provides the fabric (the glue) that brings each composition together.

Compute executes a computation for a given task. Note that a Central Processing Unit (CPU) is just one example of compute; other examples may include compute resources provided by cloud providers or the like.

Store provides storage for data pertaining to a given task. This could be implemented as a database, file storage, or distributed in-memory system.

Sense collects, processes the data from itself or other entities, and infers actionable insights that can be communicated to the Act element for further processing of a given task.

Act includes the process of discerning and executing the logic of a given task, and it does so by providing instructions for itself or to other entities, overseeing their execution.

The target is a fully de-composed model. This model allows for the creation and operation of virtual network instances overlaid on a shared physical substrate. This shared substrate, in turn, may include resource elements contributed by heterogeneous sources (e.g., the ICP and/or Telco Access providers), as well as resource elements owned by the user.

Self-Optimizing Fabric

Autonomics is employed to tame the complexity associated with such heterogeneous compositions. Autonomics, in the most simplistic terms, is collected control of multiple, possibly heterogeneous, discrete self-organizing systems that are governed by common business goals.

Today's automation systems rely mostly on static policies driven mainly by back-end data analysis, which is typical of human-in-the-loop control systems. This may work just fine with simple systems, but when it comes to nested control of disparate autonomous systems, coupled with stringent latency constraints, advanced automation techniques such as 'self-learning policies' and 'self-driving control' are beneficial.

One of the first uses of self-optimizing or self-governing systems came about in cellular radio systems, with the SON (Self Optimizing Networks) capabilities specified by NGMN and 3GPP for optimization of resources across heterogeneous access technologies. These systems, however, are based on static policies and hence limited in functional scope. Artificial Intelligence and Machine Learning have been around for quite a while, but until recently, the use of such techniques in telecommunications systems has shown limited promise. However, when combined with the flexibility afforded by SDN and NFV, the application of Artificial Intelligence and Machine Learning for autonomic network control enables the deployment of adaptive networks.

Building on this foundation, a 'Self-Optimizing Fabric' (SOF) is introduced for such adaptive networks.

Figure 9:
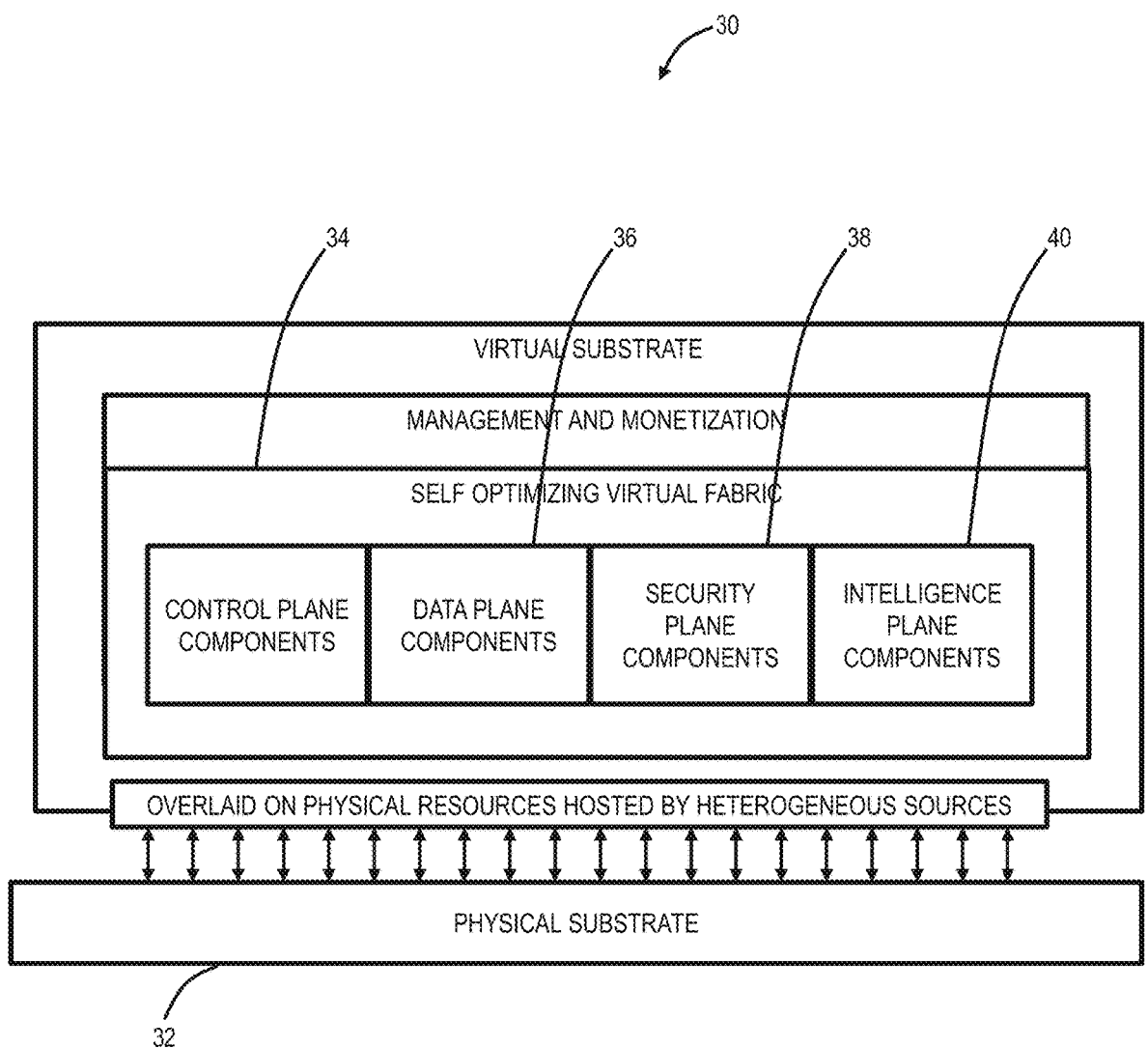
FIG. 9 is a diagram of a Self-Optimizing Fabric.

FIG. 9 is a diagram of a self-optimizing fabric 30. The SOF 30 is a logical representation of disparate resource elements (physical and virtual, represented by a physical substrate 32) stitched together with open APIs, shared information models, and common algorithms for the cohesive delivery of a service. Information models are described, for example, in commonly-assigned U.S. patent application Ser. No. 16/045,817, filed Jul. 26, 2018, and entitled "Unified management of computing networks," the contents of which are incorporated by reference in their entirety.

The SOF 30 provides a library of fully contained functional components that could be assembled into a fully operational (ideally self-contained) system, often created on-demand, to serve a particular user segment. The SOF 30 adapts itself to the needs of users and their services and applications. It can support the full range of service characteristics extremes afforded with 5G. The SOF 30 is partitionable to ensure the correct balance between performance and cost. It is a distributed processing environment where functionality is located geographically to ensure the appropriate response to the user is provided, be that capacity, immediacy in response, efficiency, or other response. SOF governance is federated across operating partners in a truly distributed processing environment. Constructing this architecture entails stitching together heterogeneous cloud systems (that are governed by disparate jurisdictions) in a seamless hierarchy.

These components can be broadly classified into the following critical functional categories:

Control Plane components 34: responsible for real-time imperative control of the data plane in concert with user service level agreements, local policies, and declarative intents exerted through the Intelligence Plane. In programmable networking parlance, the term 'declarative control' is used for a control instruction that specifies the 'what,' and, 'imperative control' for a control instruction that specifies the 'how' of the action that needs to be executed.

Data Plane components 36: responsible for the implementation of imperative control exerted by the control Plane through execution of traditional data plane functions, such as routing, forwarding, and multiplexing, etc.

Security Plane components 38: responsible for the implementation of data labeling, and explicit data flow is driven by organizational security policies, enforcement of security policies exerted through the Intelligence and Control Planes.

Intelligence Plane components 40: constitutes the nervous system of the SOF 10, responsible for data collection & monitoring, as well as learning and cognitive reasoning associated with autonomic control of multiple constituencies being controlled and/or served.

Note, the control plane is primarily involved in the data plane, which is connectivity focused while the intelligence plane spans the entire resource construct.

The SOF 30 is used as an implementation pattern that may be applied to any application scope as deemed necessary for the user segment being served; for example, the SOF 30 may be applied to enable: the confluence of Machine Intelligence and RAN SON for self-driving Mobile Networks; or the confluence of Machine Intelligence with a Programmable Data Plane for self-driving Data Centers; or self-driving Edge Cloud offerings with a combination of the above.

The following models can be used for system compositions:

Template-driven: today's user segments, e.g., traditional Mobile Broadband service, could be served by template-driven (pre-stitched) network flows. Note that the proposed model is an evolution of current Network Slicing methodologies, e.g., toward Adaptive Slicing.

Fully Decomposed: user categories requiring a higher degree of customization and flexibility, e.g., autonomous driving, will require network flows built on demand from singular SOF components.

Hybrid approaches: systems composed with common ready-made elements, combined with elements composed on-demand from singular SOF components.

Figure 10:
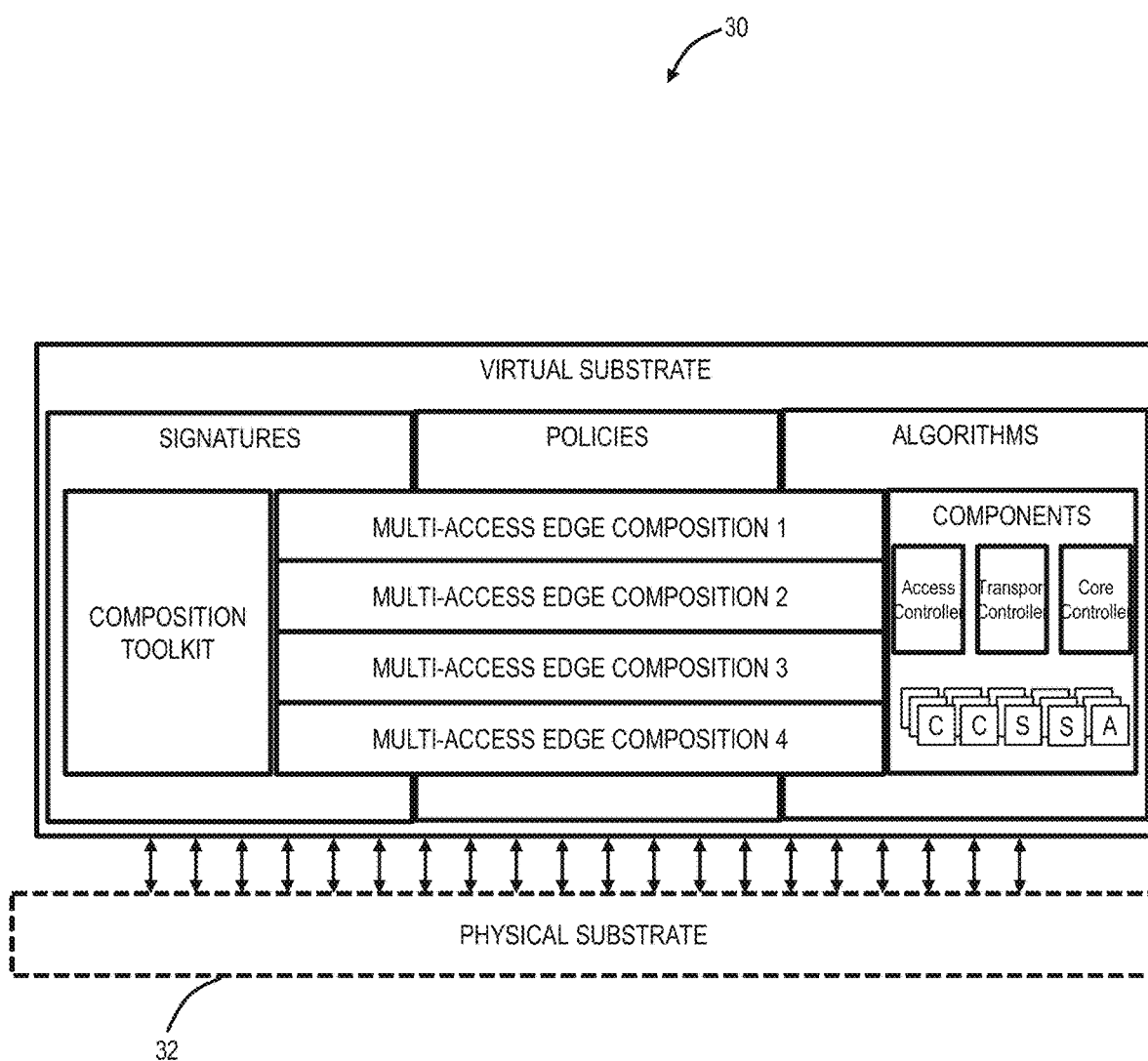
FIG. 10 is a diagram of an example of a hybrid approach composition for a Multi-Access Edge.

FIG. 10 is a diagram of an example of a hybrid approach composition for a Multi-Access Edge. The common elements in this particular composition are:

Access Controllers: Software Applications that provide control plane functions for fixed and/or wireless access, e.g., an evolution of the Radio Network Controllers (eNode-B or NR).

Transport Controllers: Software Applications that provide control plane functions of transport networks, e.g., an evolution of today's SDN Controllers.

Core Controllers: Software Applications responsible for overarching service control, e.g., an evolution of the Packet Gateway or Session Border Gateway.

Figure 11:
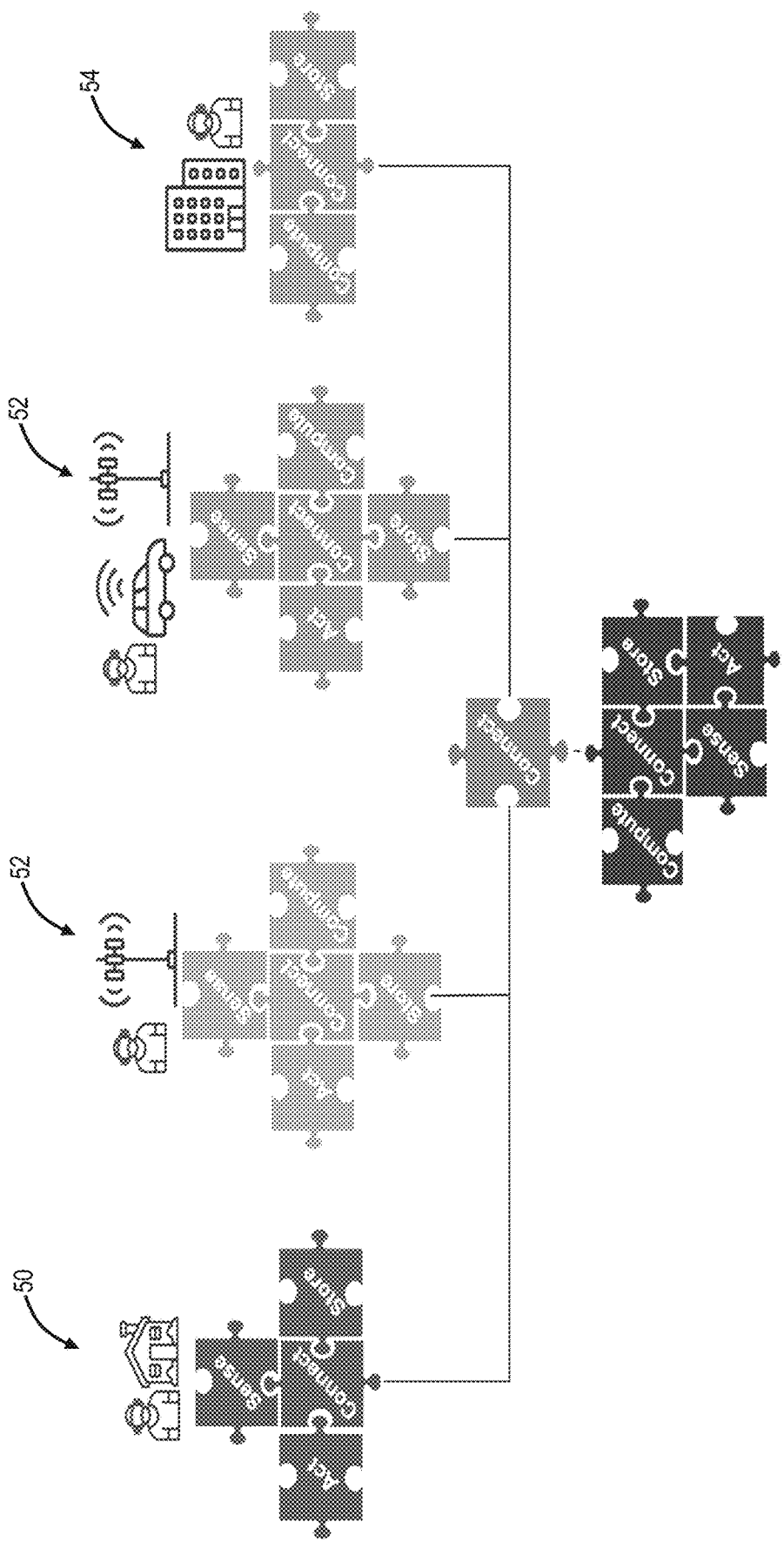
FIG. 11 is a diagram of an example distributed dynamic composition supporting an augmented reality application.

FIG. 11 is a diagram of an example distributed dynamic composition supporting an augmented reality application. FIG. 11 demonstrates the use of SOF 30 to stitch multiple heterogeneous compositions into a cohesive flow that delivers a Virtual Reality/Augmented Reality experience to a user as he/she moves across multiple jurisdictions.

In this example, a user's home 50 VR experience is enabled by a wireless home automation system provided by an ICP 54, while a 5G base station 52 enabling wireless access for the home automation system is provided by a Telco SP. The connectivity path from the home automation system to the ICP 54, therefore, goes through the cellular network provided by the Telco SP. As the user walks outside, his VR experience seamlessly transitions to an Augmented Reality experience, which is delivered by the nearest smart street light equipped with a 5G base station; note that the street light can be equipped with its own compute and control.

Based on the user's detected motion, the dynamic composition is modified so that before the user leaving their home, connectivity has already been established between storage/processing locations and the street light's compute and control, and some information has been downloaded to local storage to maintain the AR environment. If the user takes transportation that significantly changes their location, the composition may be further modified to shift content access away from local storage to more towards centralized storage (which is more efficiently accessed from a range of locations across the city.) Additionally, the source of information may change from a cell phone or headset to the mode of transportation used (e.g., car, bus, train, etc.)

In this example, the use of dynamic compositions provide a seamless user experience as the service delivery points transition through various edge nodes: home automation system 4 street light→macro site→ICP Edge. The result is a dynamically composed virtual user flow overlaid on multiple physical substrates distributed across a geographical and time continuum optimally placed for support of stringent requirements on bandwidth, latency, and reliability.

Pervasive connectivity, enabled by the amalgamation of wireline and wireless access, is at the heart of what will drastically reshape network architectures, designs, and operations. But connectivity is just one of the elements, with sense, store, compute and control being the other elements. Future systems will evolve toward a hierarchical system allowing data collection and processing to be handled across distances and with varying latency. The multi-dimensional variance of services, traffic, and control will dictate that systems be dynamically composed, on-demand, and use heterogeneous and geographically distributed resources. System compositions can continuously adapt to external and internal change stimuli by re-composing fabric partitions. Such a construct is possible with the unification of current Telco, Cloud, and IoT systems toward the Pervasive Cloud.

Important aspects include programmable infrastructure assets (Store, Compute, and Connect) that serve as building blocks for differentiated compositions of resources and intelligent software assets (Sense & Act) that serve as underlying threads of the Self-Optimizing fabric.

SOF Basic Pattern: SDIDA

Figure 12:
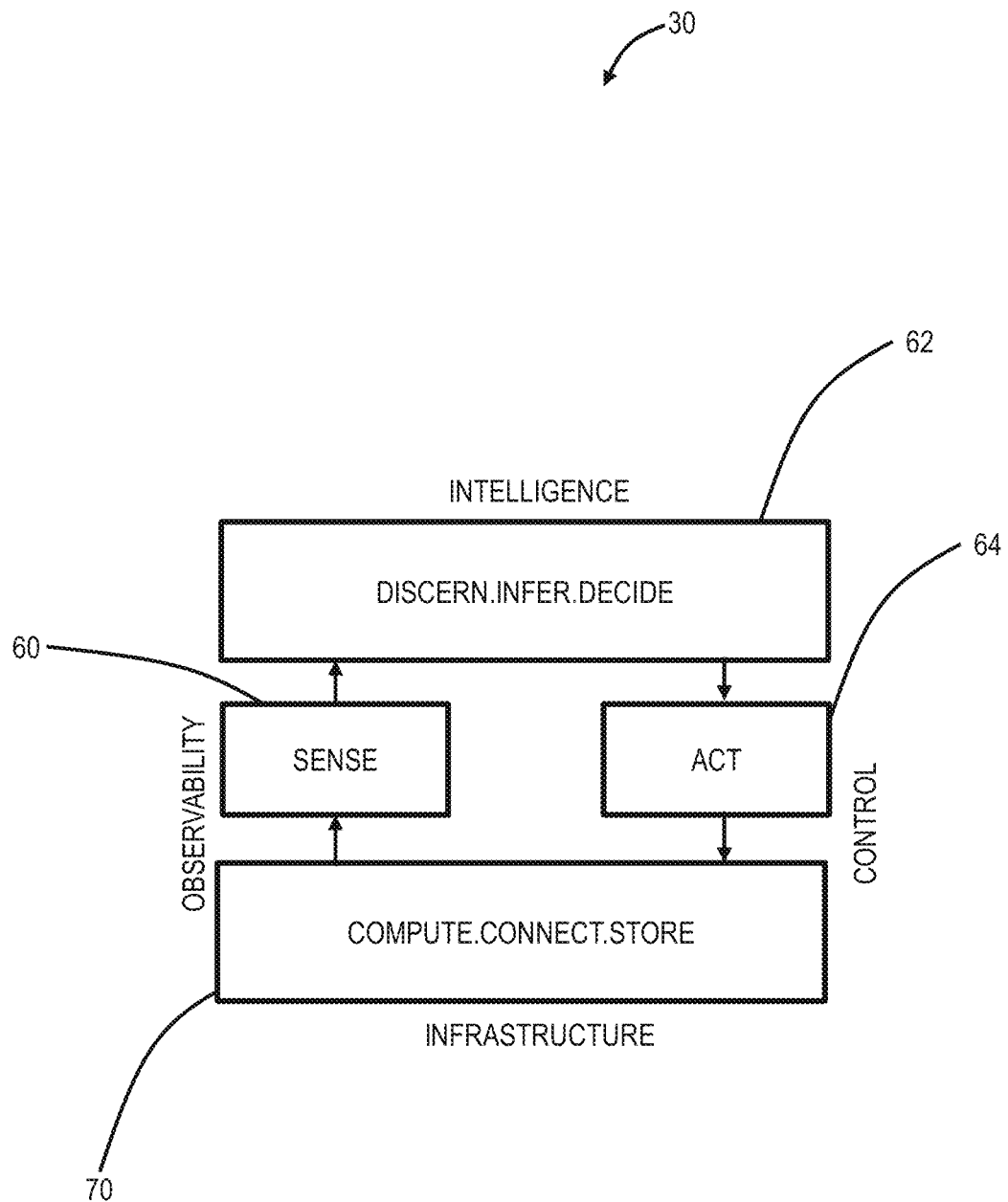
FIG. 12 is a block diagram of a SOF that includes a pattern of SDIDA where S is Sense, DID is Discern.Infer.Decide, and A is Act.

FIG. 12 is a block diagram of a SOF 30 that includes a pattern of SDIDA where S is Sense, DID is "Discern.Infer.Decide", and A is Act. Namely, the SOF 30 includes a sense element 60, a discern.infer.decide element 62, an act element 64, and compute, connect, and store resources 70. The SOF 30 is decomposed into a basic unit of intelligence and then recursively applied to drive emergent behaviors manifested as autonomic systems when applied to compossible infrastructure. As described herein, the SOF pattern is implemented by controllers in a federation.

A Value Element is a unit of functional capability that could be offered as a service. Multiple Value Elements may be combined into self-contained value constructs that may be offered as a composable service. Value constructs have evolved from static compositions of Connect elements (historically offered by classic Communication Service Providers) to dynamic compositions of Connect, Compute & Store elements (currently offered by Cloud Service Providers). Future value constructs are evolving toward self-optimizing compositions of Connect, Compute, Store, Sense & Act.

A Provider is a producer of one or more Value Element(s) that could be offered as a service through a single-provider or multiple-provider marketplace. Examples of classic Value Providers include Communication Service Provider (value element: Connect) and Cloud Service Provider (value elements: Connect, Compute & Store).

The SOF 30 is an architecture pattern of a self-optimizing construct that stitches one or more Value Elements from one or more providers in one or more value chains meshed together in a value fabric that may span multiple time and space dimensions.

The discern.infer.decide element 62 ("SOF.Discern.Infer.Decide (SOF.DID)") is an architecture pattern for components of the SOF 30 responsible for collecting data from sense element 60, classification of this data, drawing inferences into insights leading to decisions which are communicated to the act element 64 as recommendations for execution guided by these insights. These elements 62 represent the 'Intelligence' aspects of the SOF control pattern, responsible for collecting data from Sense, classification of this data, drawing inferences into insights leading to decisions that are communicated to Act as recommendations for execution guided by these insights. The level of 'Intelligence' for a particular embodiment of SDIDA varies vastly depending on the system capabilities, ranging from simple rule-based regression to intricate multi-functional and multi-dimensional 'Reasoning' similar to a human brain.

The sense element 60 is responsible for the collection of raw (telemetry) data from the respective SOF.infra (infrastructure), localized processing of data, and its dissemination across east-west interfaces (peer sense elements 60) and northbound (SOF.DID). That is, the sense element 6 is responsible for the collection of telemetry data from the infrastructure and infrastructure control and management functions of the entity being optimized.

The act element 64 includes the process of discerning and executing the logic of a given task, and it does so by taking guidance from the discern.infer.decide element 62, and by providing instructions for itself or to other entities, overseeing their execution. The act element 64 is responsible for discerning and executing the logic of a given task, and it does so by taking guidance from the discern.infer.decide element 62, and by providing instructions for itself or to other entities, overseeing their execution, e.g., infrastructure control and management functions of the entity being optimized.

The compute, connect, and store resources 70 represent the infrastructure and respective control and management functions of the entity being optimized.

SDIDA Control Pattern

Foundational to SOF is an emergent behavior of the SDIDA control pattern to handle the complexity that may otherwise result from the intertwining of disparate adaptive systems. Principle underlying assumptions are provided as follows.

1. Sophisticated behavior is emergent from an intertwining of simple parts.
2. Intelligence is emergent from an intertwining of simple parts, at least some of which contain machine learning capabilities.
3. Any part, system, or any other designation for an intertwining unit may be equipped with a machine learning capability.
4. Management, orchestration, etc. are just tools to implement control. Control strategies are in a continuum from the smallest relevant scale, i.e., fundamental components (e.g., the transistor) through systems and fabrics, to the largest relevant scale, the fabric of fabrics.
5. Control is based upon the Control loop pattern (SDIDA), which is built from the key behavioral elements Sense, Discern, Infer, Decide, and Act. Machine learning techniques may be employed for the implementation of any of these behavioral elements, especially Discern, Infer & Decide; for example, simple classification techniques for Discern, and regression techniques for Infer and Decide as in currently prevalent systems. For the nth state horizon, SDIDA strives for 'Reasoning' based Intelligence wherein an SDIDA element takes into consideration local and global context to discern the contextual meaning of the data collected from the entity, and takes into account historical perspectives and future predictive behaviors to extrapolate Discern, Infer and Decide.

6. SDIDA presents controlled views (appropriately constrained by policy and, as relevant, what has been learned from previous interactions) of what it controls (either directly or in collaboration) to clients and peers, providing apparent functionality that is some abstraction of the total functionality.

7. The SDIDA pattern applies to all domains where control is relevant, and to any aspect of 'Compute,' 'Connect' and 'Store' capabilities. Applying the SDIDA pattern consistently across the entire space (of Compute, Connect, and Store) brings the benefits in development, deployment, system interaction, etc. Solutions are readily transferable from one application to another, etc.

8. The SDIDA complex is an intricate fractal intertwining such that SDIDA patterns can be observed and indeed operate within any SDIDA element surrounding any SDIDA structure, peering with another SDIDA structure at varying degrees of intricacy, smeared across parts of one or more other SDIDA structures, etc. The full extent of the arrangement (potentially federating across commercial boundaries, etc.) is an SDIDA complex, as is any intricate part of the arrangement.

9. The views presented by an SDIDA element also determines allowed access to the presented capabilities where this access is policed by the SDIDA complex through policy and, as appropriate, learned behavior from prior interactions to abide by the view presented.

10. SDIDA is itself controlled by other SDIDA (control of control) and presents views of itself to be controlled, giving another dimension of SDIDA intricate fractal intertwining. The SDIDA complex, (as well as each constituting SDIDA entity) is self-learning and consequently self-organizing and self-optimizing.

11. SDIDA can apply to a real environment or a simulated environment where the simulation is of any degree of completeness (e.g., for evaluation of the operation of a speculated layout of system parts).

12. SDIDA best operates via agreeing on goals/objectives in terms of outcome-oriented constraint-based interaction where the provider SDIDA complex does its best to achieve the desired purposeful outcome. The controlled system state is Sensed, and the meaning of the sensed state Discerned such that the outcome achieved can be Inferred and related to the goal/intention. Discrepancies are evaluated, and Decisions made on Actions to take to improve the achieved outcome. Previous actions and outcomes are evaluated such that the SDIDA complex learns best courses of action to maintain desired outcomes optimally.

13. Via the operation method, an SDIDA complex, appropriately enabled, can exercise full control over the environment it has access to, creating, adjusting, and deleting any parts.

14. As all functions are emergent from and depend upon physical resources, each action is finally fulfilled in the physical world by some agent (the Act element of the lowest level SDIDA).

15. The SDIDA complex may have direct access to the relevant physical elements (e.g., control of a transistor, control of a robotic arm) to fulfill the action essentially itself or it may need to interact with humans to achieve the physical action 16. The agreed objectives most probably include some aspects of efficiency and optimization of utilization on all scales across all timescales while supporting all relevant purposeful outcomes.

17. The SDIDA elements, like every other aspect of the solution, depending upon real physical resources. The SDIDA complex acts on itself as it does on any other functionality. SDIDA enriches and diminishes its capabilities as needs change and as additional intelligence is acquired, be it through learning or emergence.

18. The SDIDA complex abides by a policy applied by the appropriate authority (regulatory, administration, etc.) where that authority is, in the ultimate solution, another SDIDA complex.

19. The SDIDA complex is constrained by the realities of the environment, such as physical laws, design constraints in controlled capabilities, specific constraints related to desired outcomes, etc.

20. An SDIDA complex can evolve its own policies from prior experience to be self-regulating and self-governing. The SDIDA complex creates and then is guided by a defined process and learned behavior. The SDIDA complex creates and then follows design rules, etc.

21. A basic SDIDA can be responsible for initiating the instantiation of the entire SDIDA complex where that initiation and the ongoing evolution are driven by refining goals and constrained by the available environment 22. As an SDIDA complex evolves, so necessarily must the real environment such that new physical capability is added by the SDIDA complex where necessary and physical capability is removed by the SDIDA complex where no longer necessary.

23. A specific SDIDA complex could offer the service to design SDIDA complexes for different purposes and learn via relationships about the behavior of the designs to refine its own SDIDA complex design strategies, etc.

SOF is the SDIDA complex, the environment it controls, and the purposeful functions emergent from that environment. The overall fabric controlled by the SDIDA complex is ever-changing to meet evolving goals and to take advantage of newly learned information or behaviors. These changes may be to the SDIDA complex itself, where any adjustment may take place. All aspects of SOF are instantiated, adjusted, and terminated based upon need, policy, learning, etc. including SDIDA elements themselves. SOF emerges and evolves, as driven by the demand.

Implementation Considerations

Although SOF does not rule out single-agent systems, it strives for multi-agent systems. While 'Sense' and 'Act' elements of the SOF control pattern are intimate with the local execution of the control pattern, i.e., they drive local behaviors of the control loop, pertaining mostly to a particular agent (or even a single entity within the agent), the elements contributing to Reasoning (the real intelligence), Discern.Infer.Decide are performed in collaboration with peer agents in a multi-agent system or peer entities of a single agent. Put simply, while Sense and Act are pertinent to a local scope, DID elements can contribute to global scope, i.e., DID elements can form east-west peering and north-south hierarchical relationships with respective DID elements of adjacent entities.

Although SOF does not preclude statically configured (or preconfigured as of today's systems) collaborative systems, it strives for dynamic discovery of multi-agent systems wherein agents discover each other and attach and detach with the broader ecosystem fabric dynamically on a need basis.

Although SOF does not rule out the use of static protocols for peering of multiple systems (e.g., Border Gateway Protocol (BGP) with peering IP systems), it strives for dynamic discovery and negotiation for the semantics of the protocol to be used in a particular collaboration, performed by the collaborating agents at the point of attachment and through ongoing communication, i.e., change aspects of the protocol on the fly during communication with no disruption to the exchange of information.

Although SOF does not preclude single domain fabrics, e.g., a simple embodiment of SOF is a self-optimizing connectivity fabric pertinent to the telecommunications domain, SOF strives for a symbiosis of multiple types of ecosystems targeting common business goals, e.g., a self-optimizing fabric that emerges when cyber-physical systems, telecommunications networks, and distributed cloud systems come together to address a street traffic optimization challenge cited earlier. In the most advanced form, SOF will spread seamlessly across commercial boundaries, and the commercial mix, etc. will morph and change as the purpose evolves and the environment changes. This will lead to the unification of the approach to interaction at all levels in SOF, including inter-business interaction.

Any SOF element may have within it a full SOF control pattern contributing to its essential behavior. For example, Sense may be a sophisticated SOF in itself, requiring some internal feedback and tuning to optimize its sensing behavior.

Making a SOF

The following presents a stepwise approach to illustrate the recursive application of SDIDA to stitch various embodiments of SOF.

Figure 13:
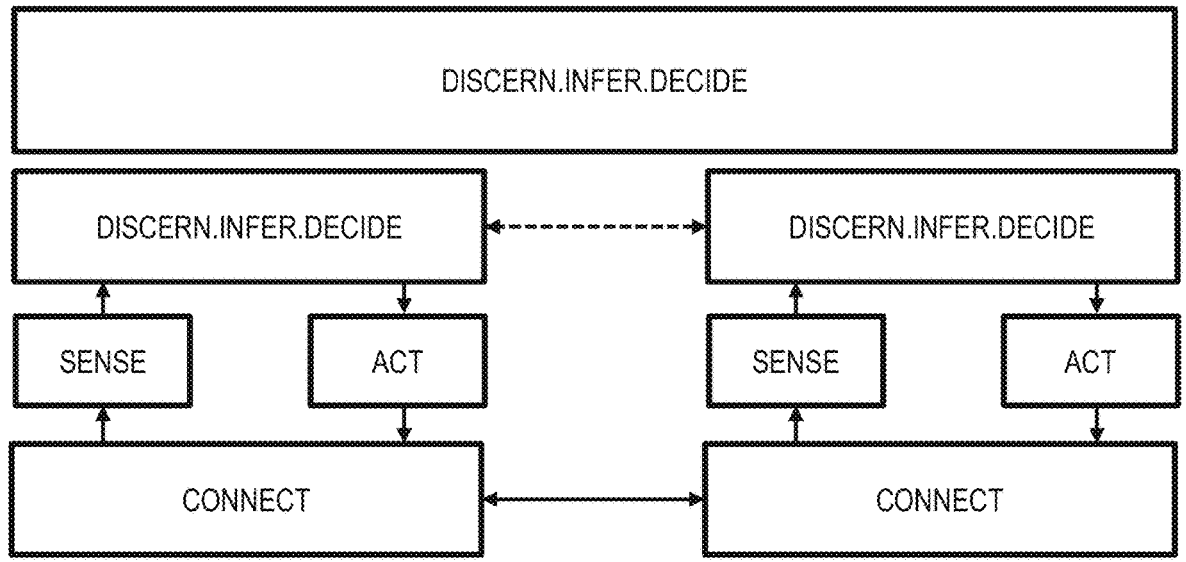
FIG. 13 is a block diagram of the first step for a distributed connect fabric.

FIG. 13 is a block diagram of the first step for a distributed connect fabric. The distributed connect fabric includes applying SDIDA to a static Communication Service Provider Value Element, 'Connect'→resulting construct is Adaptive Connect with close loop automation for the singular domain of control. Next, multiple Adaptive Connect systems are stitched together through east-west (peered) and north-south (hierarchical) federation of adjacent SDIDA entities→resulting construct is a Distributed Connect Fabric with federated intelligence.

Figure 14:
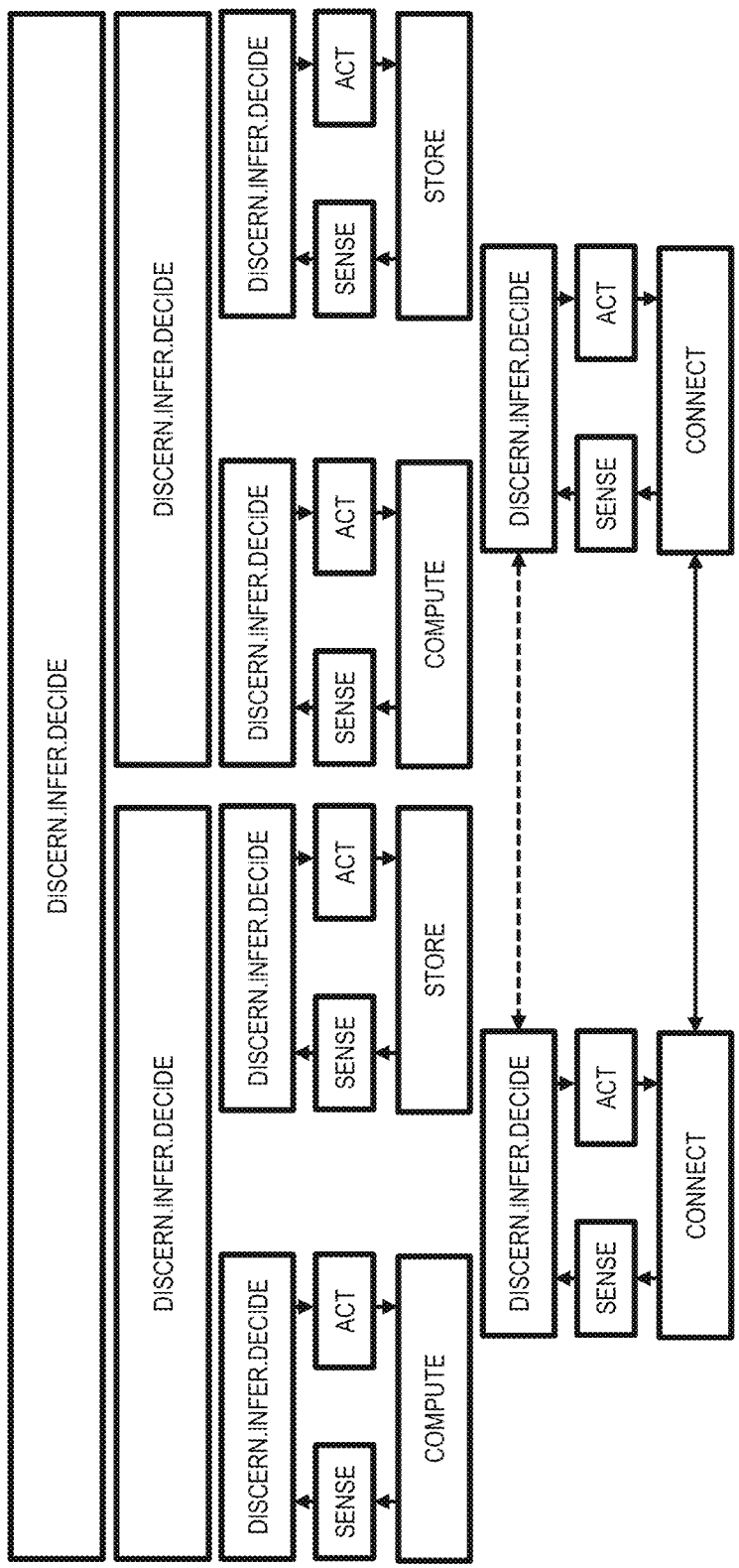
FIG. 14 is a block diagram of a second step for the distributed connect fabric.

FIG. 14 is a block diagram of a second step for the distributed connect fabric. The Infra Value Elements set are extended from Connect to Connect, Compute & Store, or any combination thereof→resulting construct is Adaptive Cloud for the singular domain of control. Next, multiple Adaptive Cloud systems are stitched together through east-west (peered) and north-south (hierarchical) federation of adjacent SDIDA entities→resulting construct is a Distributed Cloud Fabric with federated Intelligence.

Figure 15:
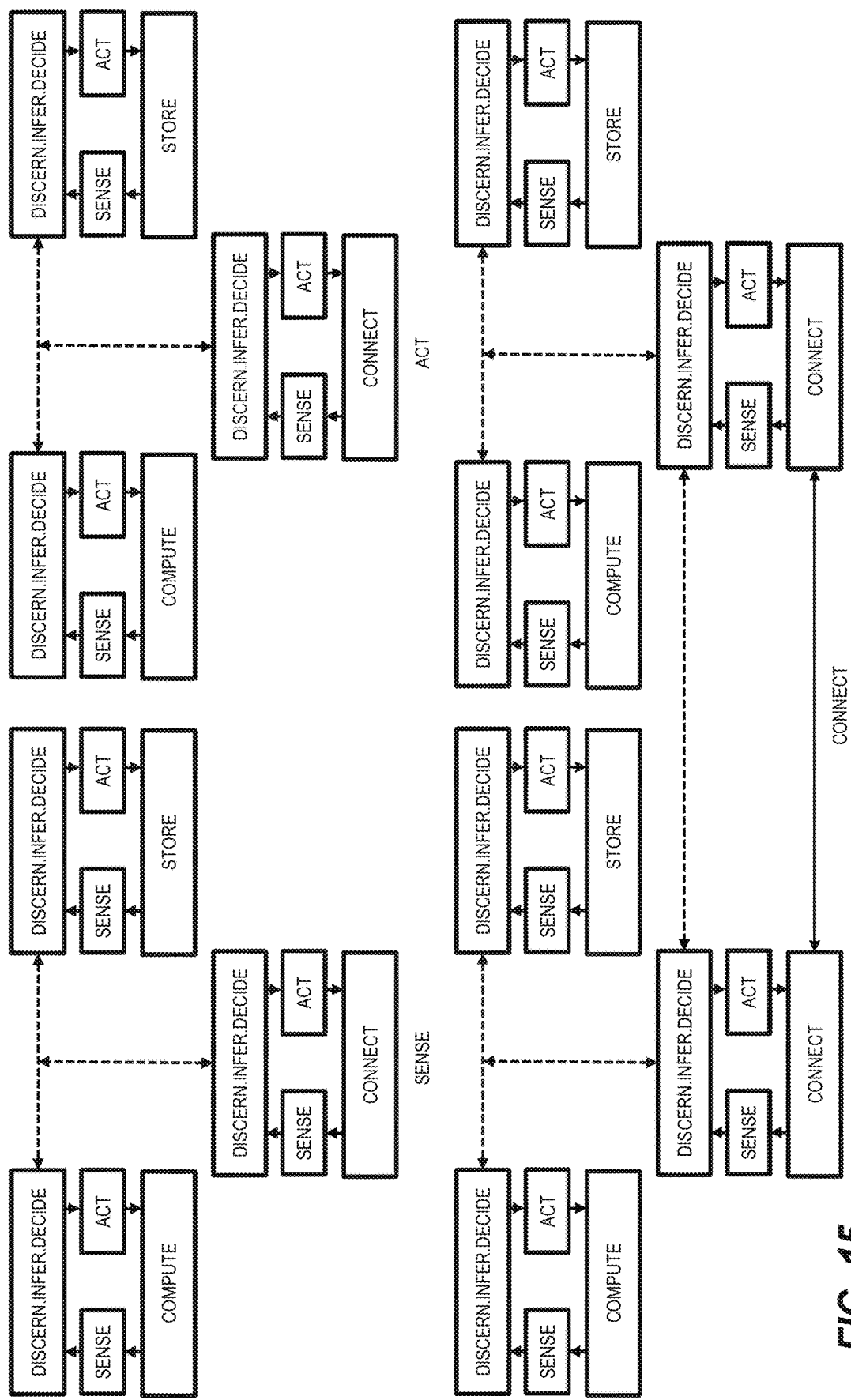
FIG. 15 is a block diagram of an nth step for the distributed connect fabric.

FIG. 15 is a block diagram of an nth step for the distributed connect fabric. The desired nth state is that of an emergent intelligence system wherein the overall system will be a fluid federation of distributed intelligence embodied in multiple self-contained intelligence agents. The governing intelligence at various levels (manifested as north-south hierarchies or east-west peering, or any other form of adjacent relationships) will be 'emergent' from the interaction of the intelligence in this fluid federation. In the ultimate system, the arrangement of all parts of the system, including those of the emergent intelligence, will be determined by the emergent intelligence itself, i.e., the system will be self-organizing and self-optimizing.

In this nth state, all aspects of SOF are instantiated, adjusted, and terminated based upon need, policy, etc.

including SDIDA elements themselves such that SOF emerges from the environment it controls.

Technologies

The drivers for the next generation network architecture described herein include access unification, the distributed cloud, and the pervasive automation. For access unification, lines between wireline and wireless access blur as 5G helps to overcome inhibitors for broadband convergence: bandwidth, reachability, and performance. The distributed cloud includes the massive application of Machine Intelligence in all facets of use cases and IoT Device Swarms driving a pull toward Distributed Computing. For pervasive automation, advances in Robotics and Artificial Intelligence elevate plausible levels of autonomy in consumer and industrial processes to higher degrees.

Processing Device

Figure 16:
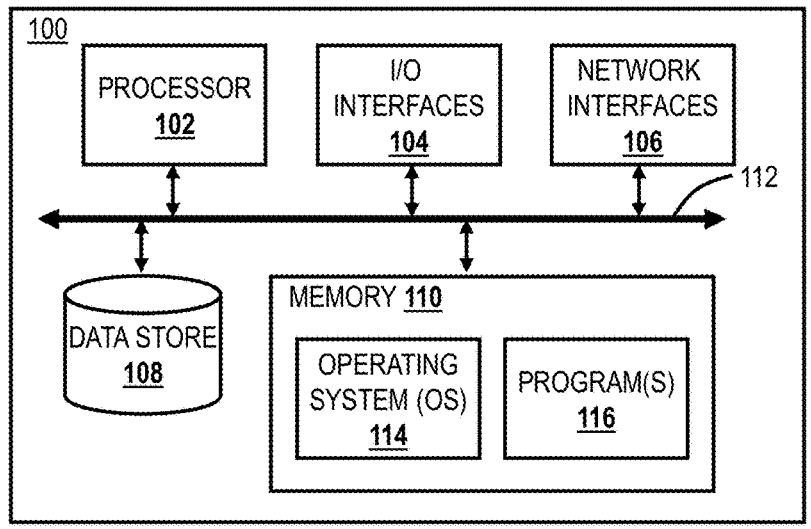
FIG. 16 is a block diagram of a processing device that may be utilized for the physical implementation of the controllers described herein as part of the SOF, the SDIDA pattern, etc.

FIG. 16 is a block diagram of a processing device 100 that may be utilized for the physical implementation of the controllers described herein as part of the SOF 10, the SDIDA pattern, etc. The processing device 100 can be a digital device that, in terms of hardware architecture, generally includes a processor 102, input/output (I/O) interfaces 104, network interfaces 106, a data store 108, and memory 110. It should be appreciated by those of ordinary skill in the art that FIG. 16 depicts the processing device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the processing device 100, a semiconductor-based microprocessor (in the form of a microchip or chipset), or generally any device for executing software instructions. When the processing device 100 is in operation, the processor 102 is configured to execute software stored within the memory 110, to communicate data to and from the memory 110, and to generally control operations of the processing device 100 pursuant to the software instructions. In an exemplary embodiment, the processor 102 may include a mobile-optimized processor such as optimized for power consumption and mobile applications. The I/O interfaces 104 can be used to receive user input from and/or for providing system output.

The network interface 106 may be used to enable the processing device 100 to communicate on a network, to communicate with various devices for resources, communicate with other controllers, etc. The network interface 106 may include, for example, an Ethernet card or adapter (e.g., 10BaseT, Fast Ethernet, Gigabit Ethernet, 10GbE), a Wireless Local Area Network (WLAN) card or adapter (e.g., 802.11a/b/g/n/ac), and/or a 4G/5G wireless interface. The network interface 106 may include address, control, and/or data connections to enable appropriate communications on the network. The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 can include one or more software programs, each of which includes an ordered listing of executable instructions for implementing logical functions. In the example of FIG. 4, the software in the memory 110 includes a suitable operating system (O/S) 114 and programs 116. The operating system 114 essentially controls the execution of other computer programs, and provides scheduling, input-output control, file and data management, memory management, and communication control and related services. The programs 116 may include various applications, add-ons, etc. configured to provide end-user functionality with the processing device 100, including performing various aspects of the systems and methods described herein.

SDIDA Process

Figure 17:
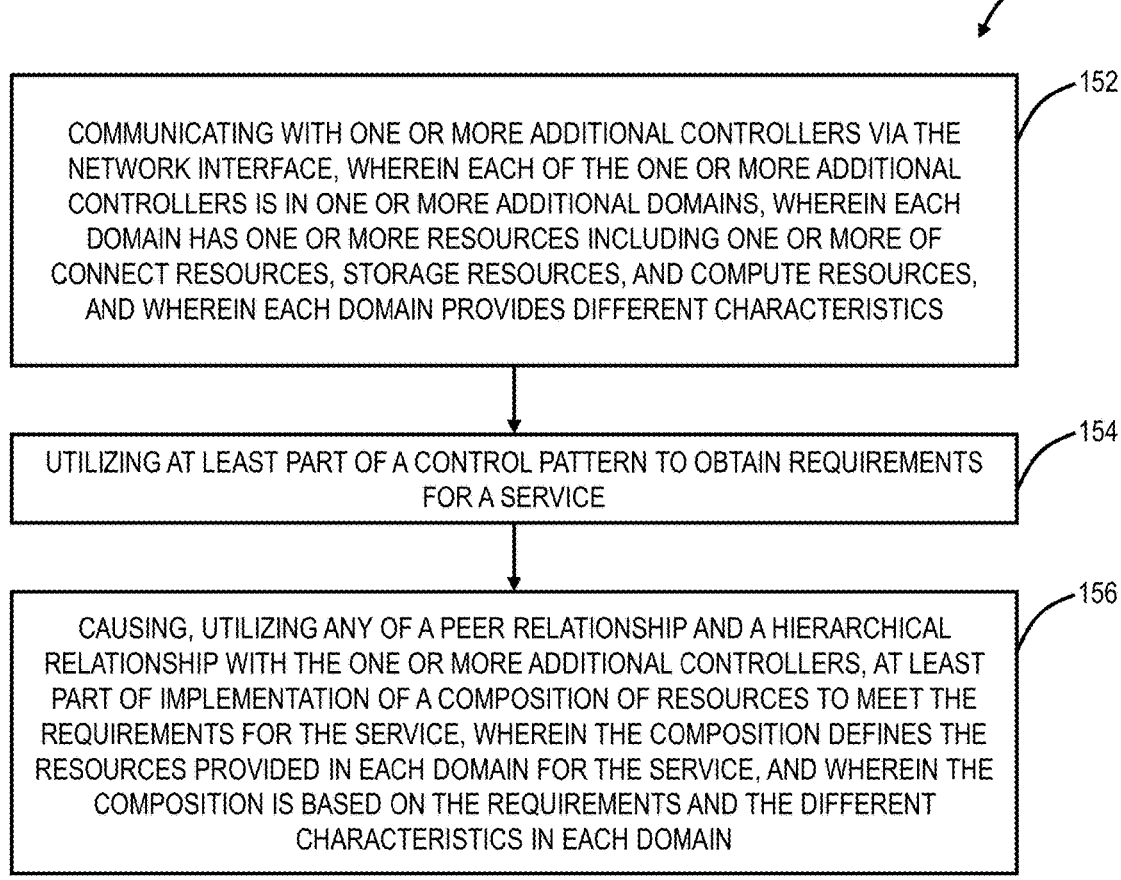
FIG. 17 is a flowchart of a process implemented by a controller with other controllers for implementing the SDIDA pattern.

FIG. 17 is a flowchart of a process 150 implemented by a controller with other controllers for implementing the SDIDA pattern. The process 150 contemplates realization via the processing device 100, as instructions stored in a non-transitory computer-readable medium, and as a computer-implemented method. The process 150 is illustrated from the perspective of a single entity, i.e., a controller, in a domain that interacts with other entities. Those skilled in the art will recognize the SOF 30, implementing the SDIDA pattern contemplates a distributed architecture where there are multiple controllers, interworking with one another to allocate resources under the control of its domain, to provide an overall composition of resources for a service.

The process 150 includes communicating with one or more additional controllers via a network interface, wherein each of the one or more additional controllers is in one or more additional domains, wherein each domain has one or more resources including one or more of connect resources, storage resources, and compute resources, and wherein each domain provides different characteristics (step 152). As noted herein, a domain is anything that provides resources. Also, the controller itself can be integrated in the domain. The resources are compute, storage, and networking resources.

The process 150 includes utilizing at least part of a control pattern to obtain requirements for a service (step 154). Of note, the controller is configured to implement a part of the control pattern, e.g., SDIDA, with respect to the resources under the control of the controller. A service will need resources that extend beyond the control of a single controller, which is where the description states the controller utilizes "at least part" of the control pattern.

The process 150 includes causing, utilizing any of a peer relationship and a hierarchical relationship with the one or more additional controllers, at least part of the implementation of a composition of resources to meet the requirements for the service, wherein the composition defines the resources provided in each domain for the service, and wherein the composition is based on the requirements and the different characteristics in each domain (step 156).

The present disclosure contemplates various control patterns working together (N-S, E-W dependencies) to form a composition of resources for a service. Of note, the controller itself is a resource—not all resources are controllers, but all controllers are resources.

The control pattern includes sense, discern, infer, decide, and act elements, namely the SDIDA elements described herein. The sense and act elements utilize a local context to affect the resources it interacts with, while the discern, infer, and decide elements have a global context across a scalable spatial continuum via the relationship with the additional controllers. As described herein, the local context means any resources that the controller itself has sense/act functionality therewith. Conversely, the global context is anything else, including the entire composition, as well as a subset of the entire composition that is greater than the local context.

In an embodiment, the controller acts in a co-operative manner with at least one of the additional controllers, where each controller maintains information about its contribution to the composition, including performance indicators. In another embodiment, the control pattern of the controller interacts with a second control pattern of at least one of the additional controllers in a competing manner, where each controller maintains information about its contribution to the composition, including performance indicators.

The controller and the additional controllers are configured to self-regulate and self-optimize in their respective domains, using a common control pattern of sense, discern, infer, decide and act elements. An of the control pattern includes at least part of a second control pattern embedded within to refine the element.

The controller interacts with the additional controllers to form a controller complex, namely the SOF 30, that self-assembles, self-regulates, and self-optimizes.

The controller adds or deletes resources dynamically within the domain to meet the requirements. In an embodiment, the controller initiates the instantiation of at least one additional controller to form a controller complex. Again, the controller itself is implemented by the resources. The peer or hierarchical relationship with at least one of the additional controllers is formed dynamically through discovery and attachment.

At least part of the control pattern utilizes Machine Intelligence techniques.

Each domain is one of different ecosystem types (e.g., 5G, which is an ecosystem of interconnected intelligence systems) and/or spans commercial boundaries (i.e., different providers).

In an embodiment, the controller and the one or more additional controllers are each included in a node of a plurality of nodes, and wherein the plurality of nodes are assembled into a self-assembling network to implement the composition that includes a geographic distribution of the plurality of nodes, and is based on the requirements which include one or more of latency and jitter. The nodes can be data centers, including any of terrestrial data centers, non-terrestrial data centers, and combinations thereof. The nodes can be flying devices, such as described herein, and the implementation of the composition involves a rearrangement of the flying nodes.

The control pattern obtains the requirements for the service based on ongoing monitoring of any of i) performance of the service and ii) performance of each domain. The control pattern obtains updates related to any of the requirements for the service and performance of each domain, and wherein changes to the composition are caused based on the updates.

The characteristics include any of latency, bandwidth, jitter, and cost. The characteristics can include latency, and wherein, for the service, a first domain has lower latency than a second domain, which has lower latency than a third domain.

Each domain can include one or more disparate devices that communicate with the controller via open Application Programming Interfaces (APIs) and shared information models.

The control pattern can utilize a connectivity graph between the plurality of resources and performance indicators related to connectivity and capability of the plurality of resources, to determine the composition, and wherein the controller and the additional controllers participate in a distributed search of the connectivity graph. At least one of the resources implement at least part of a control pattern therewithin.

A relationship between the controller and at least one of the additional controllers is at a dynamically varying intricacy level that indicates a detail of information exchange therebetween. Specifically, in the larger forms of SDIDA, each with a learning engine, the SDIDA complex has many SDIDA and hence many learning engines. A pair of SDIDA controllers may be communicating in abstraction about the results of their learning, but then may choose (as SDIDA is self-arranging, etc.) to merge their learning engines.

Those skilled in the art will recognize there are various techniques for so-called path computation, resource allocation, etc. in terms of putting together the actual composition. All such techniques are contemplated herein. Specifically, these techniques involve determining the composition (how the resources are configured to support a given service) based on metrics (some values used to make decisions).

SDIDA Element

An SDIDA element can utilize the processing device 100 to implement the SDIDA pattern described herein. An SDIDA element may be embedded in an element of an SDIDA of another SDIDA complex where the embedded SDIDA is contributing directly to the task of that SDIDA element and where 'Learning' and 'Intelligence' are present in the embedded SDIDA complex to make ongoing improvements to the achievement of the task.

An SDIDA element may be embedded in an element of an SDIDA of another SDIDA complex where that embedded SDIDA complex is refining the behavior of that element. For example, a Sense element of an SDIDA may have an embedded sophisticated 'Self-Learning' capability that refines the sense over time. The embedded SDIDA element may be shared across many equivalent SDIDA elements (virtually embedded) such that information from the many elements can be pooled for an improved 'Collective Learning.' The virtually embedded SDIDA complex may be offered as a service tuning the SDIDA element.

An SDIDA element may peer with another SDIDA element at a very intricate level such that the detailed 'Learning' and 'Intelligence' algorithm of some part of that SDIDA element is intertwined with the corresponding detailed algorithm of the corresponding part of the corresponding element of another SDIDA, exhibiting 'Collaborative' and/or 'Competing' embodiments of Collective Learning and Intelligence.

An SDIDA complex is self-forming, self-regulating, and self-optimizing. The SDIDA complex includes a federation of SDIDA elements, such as illustrated in FIGS. 13-15. In the ultimate form, the SDIDA complex, including federated SDIDA across a Value Fabric of multiple commercial businesses, from its own experiences, formulates and then abides by policies, etc.

A seed SDIDA element can control the initial formation of an SDIDA complex that can then begin to self-govern, etc. An SDIDA complex is responsible for designing SDIDA complexes.

5G Reference Architecture

Figure 18:
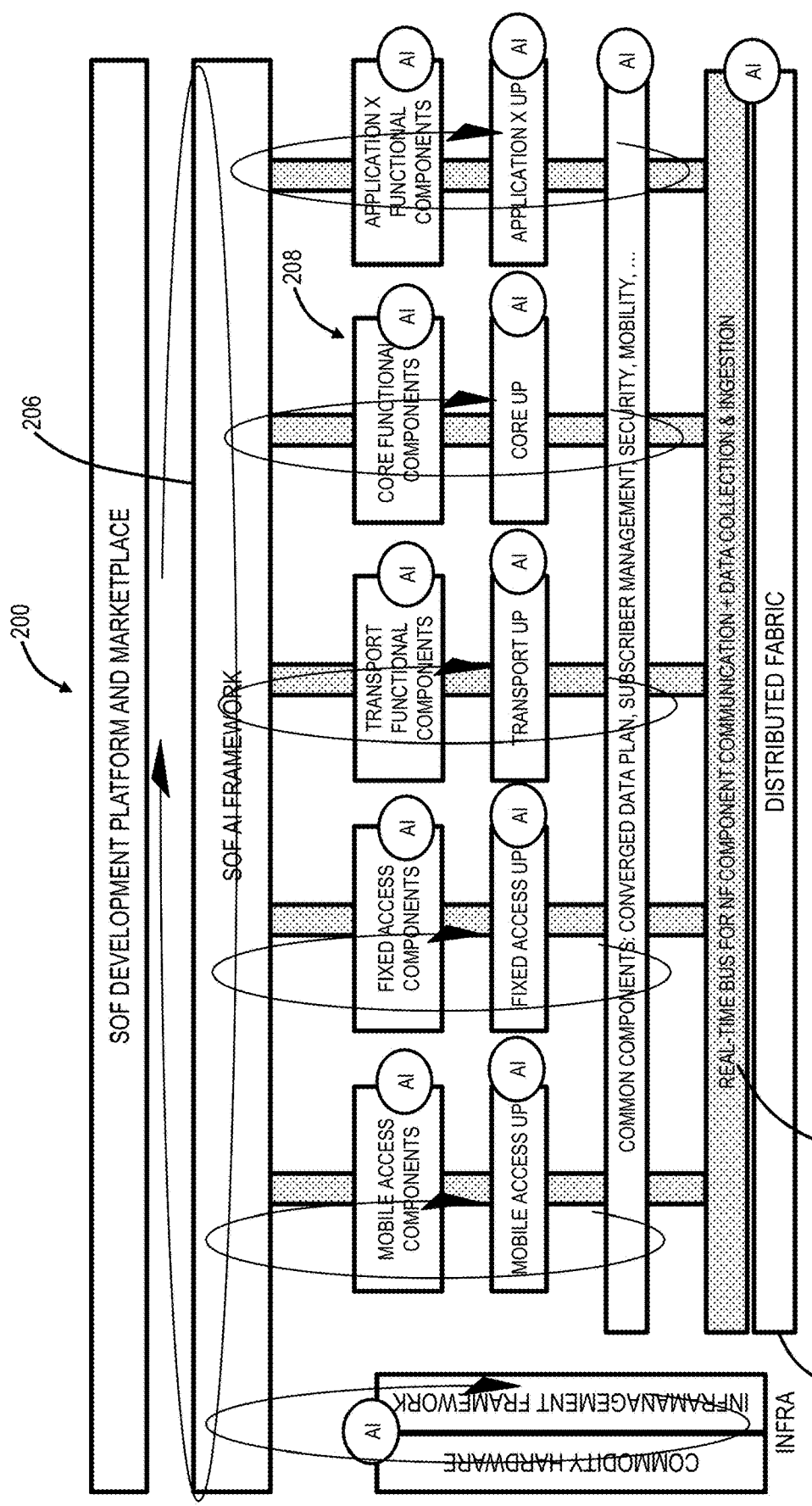
FIG. 18 is a diagram of a 5G edge reference architecture utilizing the SOF.

FIG. 18 is a diagram of a 5G edge reference architecture 200 utilizing the SOF 30. The reference architecture 200 includes a distributed fabric 202, a real-time bus 204, an Artificial Intelligence (AI) framework 206, and network elements 208. The real-time bus 204 provides Network Function (NF) disaggregation, data collection, and ingestion. The AI framework 206 includes the SOF 30 and the federation of controllers. The network elements 208 in this example include mobile access components, fixed access components, transport functional components, core components, and application functional components.

The requirements resulting from this disparate set of applications (that form services) are driving a fundamental change in the design and deployment of mobile systems.

Key elements of this pivot are:

The need to federate heterogeneous service environments, e.g., telco access services and Cloud Data Center services, stitching disparate control systems to distribute 'Resources' (including compute, storage, networking) and 'Intelligence' in a spatial-temporal manner such as with edge computing placement.

The need to support heterogeneous compute environments, including Graphical Processing Units (GPUs, highly programmable network accelerators, etc., in addition to traditional compute, storage, etc.

The need for new functional elements that enable the collection, monitoring, and accumulation of sensor data, as well as processing and dissemination of control information from a wide array of end-user devices ranging from traditional mobile devices of today to cyber-physical systems of the future. This includes mechanisms to collect real-time radio network information, process it in real-time (e.g., Geo-Location data), summarize, anonymize, etc. and make it available to third party applications deployed at the edge, a central location or outside the service provider's environment.

The need for distribution of compute that allows sensor 'data' to be processed locally into 'information,' and then into 'knowledge'; and finally, into 'wisdom' when processed with global context over a sustained period of time; the broader the data set, the deeper the wisdom discerned.

To effectively align with this pivot, edge systems must evolve toward a recursive model that helps to address complexity while enabling extreme flexibility. Edge systems must become increasingly adaptive to enable a system of ultra-lean modular compositions that maximizes extensibility. This must be done with minimal redundancy, and to eliminate hardware and software dependencies.

The 5G edge reference architecture 200 includes the architecture pattern that replaces the current monolithic systems with simple control applications. With this approach, creating a user flow becomes a matter of stitching together these control applications with east-west and north-south interfaces. These control applications could be implemented with a set of Control Plane components associated with respective User Plane (UP) capabilities and resources applicable to the domain they serve, e.g., the Mobile Access Components associated with Mobile Access UP for the RAN, and similar associations for control applications representing other domains in FIG. 18.

Figure 19:
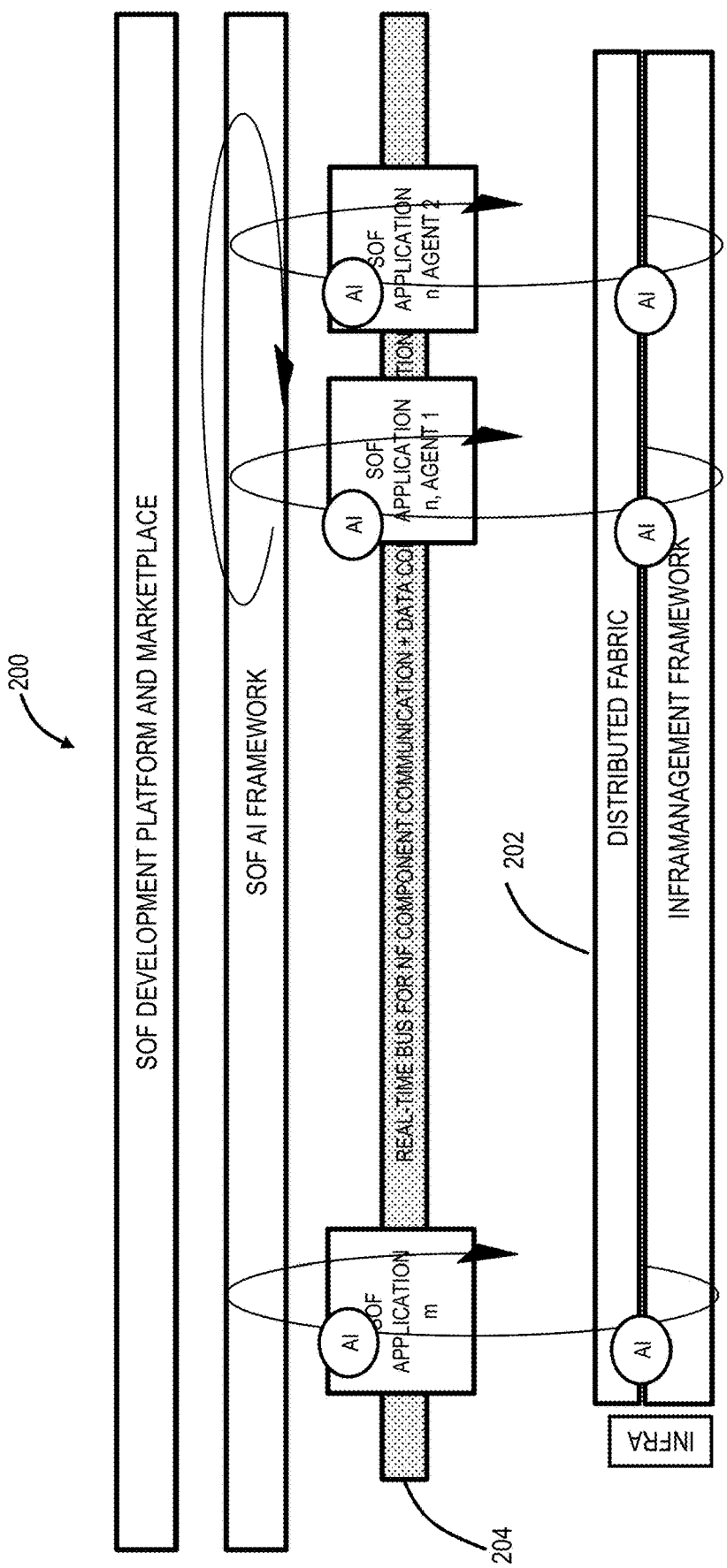
FIG. 19 is a diagram of a portion of the 5G edge reference architecture illustrating the peer relationships and hierarchical relationships of controllers and interaction over the real-time bus.

FIG. 19 is a diagram of a portion of the 5G edge reference architecture 200 illustrating the peer relationships and hierarchical relationships of controllers and interaction over the real-time bus 204.

The 5G edge reference architecture 200 can include a marketplace: a virtual bazaar for consumers and producers to trade digital goods. The marketplace enables the creation of dynamic compositions-various functional elements or systems that are created on-demand, with minimal resources, often from different sources, and optimally placed to match the needs of the services they provide. Dynamic compositions rely on advanced machine learning techniques that are influenced by both internal and external stimuli. This makes the compositions, and therefore SOF, both adaptive (when influence by internal factors) and adaptable (when influenced by external factors.)

Disaggregation

The virtualization of network functions and the disaggregation of traditional network equipment presents an opportunity to build networks in fundamentally different ways than they are built today.

Disaggregation is the concept of breaking apart a tightly integrated system into its individual components. The purpose is to: 1) allow the system to use any of many available components for a specific function, and 2) allow the disaggregated components to be recombined more efficiently. By providing the flexibility to choose which components are used, the component with the "best" attributes (cost, scalability, latency, etc.) can be used. In an open, standardized system, these components can come from any provider (and thus avoid vendor lock-in.) The flexible interchange of components also allows the ability to introduce new functions into the system, with the possibility of creating entirely new services, without having to reconstruct the entire system.

Disaggregation has shown it can be very disruptive to the industry to which it is applied. Take, for example, how the personal computer disrupted the mainframe computer market.

The main issue with a disaggregated composition is the complexity introduced when the components are no longer part of an integrated system. Specifically, the main challenges are how the components communicate with each other and how packets flows are mapped through the various components. To achieve this, a virtualized and modularized network OS is required that allows the use of APIs between disaggregated software components.

Disaggregation has the following three advantages of integrated devices:

1. Cost: Use of open-source hardware and software, as well as slowing competition amount the components, will lead to cost reductions.

2. Feature Flexibility: Feature and functionality in networking equipment are locked into a cycle of software releases. Upgrading the software on an integrated device often requires taking the device completely offline. In a disaggregated architecture, the software can be added or changed on the system as fast as the software modules are developed.

3. Scalability: In a disaggregated architecture, only the components that need to be upgraded can be. If, for instance, the forwarding/user plane needs to be upgraded for bandwidth or density issues, then this can be accomplished without replacing or upgrading the control plane.

Programmability

In addition to the advantages of disaggregation, concepts such as SDN have the opportunity to fundamentally change network architectures by allowing networks to be built around centralized control instead of traditional distributed control. SDN separates the control plane from the forwarding plane, allowing the network to be composed of a (logically) centralized control system that manages multiple, dispersed elements. SDN enables the creation of a network platform, over which network applications and an ecosystem of functions and applications can further be built. This further supports the ability to achieve new functions, re-architecting the flow between network components.

There is also value in the ability to program the forwarding plane. Programming the forwarding plane with protocols such as P4 or NPL allows the implementations of new functions, or features for specific needs, all at DevOps speed and contained within the forwarding plane. This allows the service providers to implement new functions, and enable them to open up the network devices to their customers, allowing the customers to run custom-designed functions.

One example of how a programmable switch could be used would be to incorporate security functions (i.e., firewall-like filtering functions) directly into the packet switches themselves. This would theoretically eliminate the need for separate firewall appliances or virtual firewall functions, and thereby integrate security into the network fabric itself. Another example is VNF offloading, including functions such as BNG, which by being included in the packet switches, free up the resources on general compute servers.

Disaggregation of Latency Constrained Network Functions

A key tenet of this architecture is the replacement of monolithic applications with disaggregated applications made up of multiple reusable components.

When a monolithic application is broken down into its component parts, a potential pitfall exists for applications with real-time communication requirements between the components. This is especially evident with components that have control loops at different timescales that require the close coordination that was possible in the monolithic construct. One example of where these types of control loops exist is in the 4G and 5G RAN and Edge. The objective is to ensure that the disaggregated application achieves the same performance as it had as a monolith.

One solution is to ensure that components are not placed any further apart than the latency would allow, but this is not enough to ensure the prioritization of messages at different time scales. To support this requirement, one option is the real-time bus used for inter-component and extra-component communication. The real-time bus is a carefully choreographed balance between hardware, software, and network engineering. The main participants in the real-time bus would be the compute hosting the components and the top-of-rack switch.

Hardware requirements include packet acceleration techniques within the container host(s) such as Field Programmable Gate Arrays (FPGAs) and offload hardware such as smart Network Interface Controllers (NICs). The software could include Vector Packet Processing (VPP), Single Root Input/Output Virtualization (SRIOV), Data Plane Development Kit (DPDK), Netmap, PF_RING, and a host of other accelerators as well as queue managers.

The real-time bus would work together to ensure that the time-domains of inter-component messages are respected such that none of the messages at any of the timescales get delayed beyond what is acceptable for that time-domain.

Distribution & Interconnection of Disaggregated Functional Components

A distributed edge cloud presents some challenges for management and service deployment. One approach that can be used to simplify the distributed edge-cloud is to make it appear as a single borderless cloud. There are different ways that this can be achieved using either a centralized mechanism or, more preferably, a distributed mechanism.

An edge-cloud is composed of three key resources: compute, store, and connect (networking). These three resources are distributed throughout the edge-cloud and serve as a platform for the delivery of services. These services can be composed of interconnected components running on different compute platforms using storage and collaborating over connect.

The aggregate of all of these resources, regardless of their distributed nature, can be viewed as a single fabric used to deliver services. Each resource has two fundamental behaviors that can be leveraged to assemble this distributed fabric. First, a resource can be queried (sensed) to gather information on its current state, and, second, each resource can be requested to take a specific action (act). Using these fundamental properties, each resource can be equipped with a software process that has a control loop that continuously senses the state of the resource, discerns key information, infers and decides on some action, and then requests that the resource take action.

These software processes also possess the ability to communicate with each other, which enables them to collaborate and construct fabric-based services from individual resources. Each of these processes is independently able to receive an intent request and then work with peer processes representing other resources to assemble the service represented by the intent. This fully distributed model allows new resources to be added or existing resources to be removed with very little operational overhead. The new resource "looks" for other peer processes and automatically integrates itself into the overall fabric.

Using this approach, one need not worry about the individual components or where they're located and how they're interconnected. The software processes are able, through collaboration, to establish the most optimized placement and interconnection of workloads to meet the requested intent as long as the required resources are available.

Distribution of Intelligence for Self-Optimizing Systems

Optimal distribution of Intelligence is a crucial challenge for 5G Edge systems expected to serve a multitude of disparate autonomic systems, which may in-turn comprise of device swarms that contribute localized autonomic control to their respective systems.

Currently, prevalent automation systems rely mostly on static policies driven mainly by back-end data analysis, which is typical of human-in-the-loop control systems. This works just fine with simpler systems of today, but when it comes to nested control of disparate autonomic systems, and stringent latency constraints anticipated with 5G era control applications, advanced automation techniques such as 'self-learning policies' and 'self-driving control' are deemed essential.

One of the first uses of self-optimizing or self-governing systems came about in radio systems, with the SON (Self Optimizing Networks) capabilities specified by NGMN and 3GPP for optimization of resources across heterogeneous access technologies. These systems, however, are limited in functional scope.

Similarly, Artificial Intelligence and Machine Learning have been around for a while, but the use of such techniques in telecommunications systems has just recently shown some promise. When combined with the flexibility afforded by SDN and NFV, application of Artificial Intelligence and Machine Learning for autonomic system control provides a perfect breeding ground for self-optimizing systems that are dynamically composed and continuously adapt themselves with a fabric of recursive control defined in terms of Sense (detect what's happening), Discern (interpret senses), Infer (understand implications), Decide (choose a course of action), and Act (take action).

Network-as-a-Service Use Case

A Network-as-a-Service (NaaS) application includes multiple domains, each that can operate somewhat independently of each other. A Telecommunications Service Provider may already have some of the required domains, which could then be incorporated into a NaaS offering.

Figure 20:
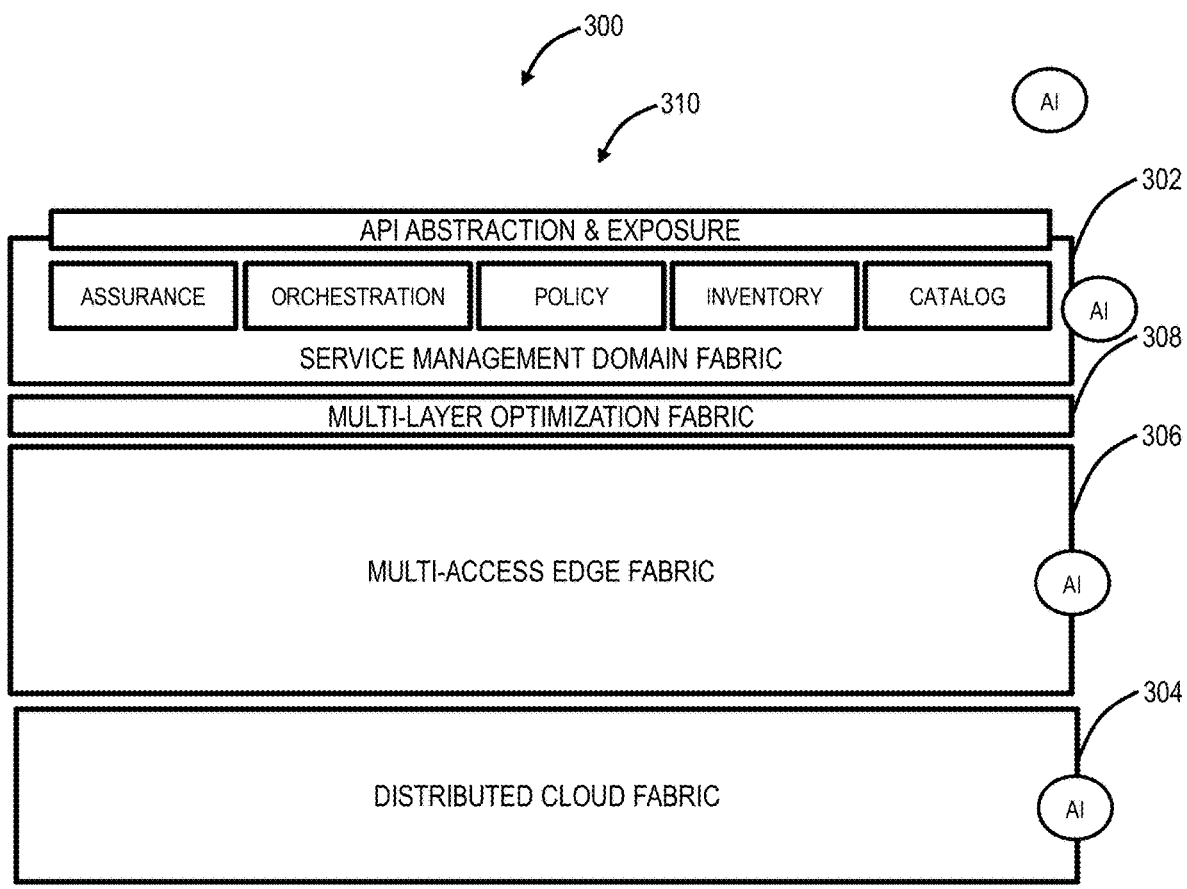
FIG. 20 is a block diagram of a Network-as-a-Service (NaaS) offering.

FIG. 20 is a block diagram of a NaaS offering 300. The NaaS offering 300 includes a service management domain fabric 302, a distributed cloud fabric 304, a multi-access edge fabric 306, a multi-layer optimization fabric 308, and a digital marketplace 310.

The service management domain fabric 302 is composed of several functions that have the capability of working with each other: These include Assurance, Orchestration, Policy, Inventory, Analytics, and Catalogue functions. The functions can then be made accessible to application platforms via APIs, and partnering with a marketplace provider will create a storefront. All of these service domain management capabilities can now be used overtop existing wireline or wireless networks to achieve a primary NaaS offering.

Traditional network architectures are based on relatively few, large data centers. However, latency-critical applications of 5G (specifically uRLLC) will require distributed parallel processing of crucial network functions across a multitude of micro-data centers distributed across the Access Edge. The critical observation here is that the mobility service anchor point, which traditionally resides in a national data center, will move closer to the Access Edge to serve these latency-critical applications.

Optimal placement of network functions and dynamic distribution of processing of these functions across the Access Edge for support of seamless user mobility, while engaged in latency-critical applications, becomes a key challenge. The distributed cloud fabric 304 underpinned with performance Packet Optical equipment and a latency aware distributed fabric OS for programmability and control, become an essential enabler for the 5G Edge.

With the distributed cloud fabric 304 in place, the next step would be to stitch a multi-access edge fabric 306 with the minimum viable network function components required to serve a particular user need. These could be as simple as a functional chain for enabling e-sport or as intricate as a private network service stack. These functions are essentially the monolithic functions of today, but disaggregated into multiple components, and enhanced with open programmatic interfaces that transform these functions into control applications. The multi-access edge fabric 306 is, in essence, a collection of control applications that drive application-specific behaviors through a converged data plane underpinned with a real-time transport fabric.

Within the multi-access edge fabric 306 is a representation of 3GPP Radio Access Technologies (RAT), consisting of 5G New Radio (NR) and 4G LTE. Both are controlled by the same Radio Intelligent Controller (RIC), which in this case, is specified by the O-RAN Alliance. Adding in wireline technologies, like PON and WiFi (with their respective controllers), these can then be controlled at a higher layer with an Intelligent Access Controller. This then allows cross-RAT or Heterogeneous Network (HetNet) control. 5G Core, along with SD-WAN, is used for controlling the transport network.

Private networks, based on enterprise networks and private wireless networks, only require a lightweight 5G Core. Some functions, like subscriber management, are common between them. What is needed is a common controller between 5G and Enterprise, the Intelligent Core Controller, that allows a mix and match of technologies across 3GPP and non-3GPP RATs.

Each section described, and the entire fabric can be thought of as a collection of heterogeneous networks. The control of these HetNets can be applied to a macro-system, like a traditional macro-cell mobile network, or a micro-system, like a private 5G, LTE, or WiFi network running inside an enterprise. All three areas of the multi-access edge fabric 306 can be brought together and coordinated with an Intelligent Heterogeneous Network Controller.

Each fabric described thus far can have its own optimization. The SDIDA control pattern, when applied to each individual fabric (denoted by the "AI" in the diagram) can enable a varying level optimization, from configuration driven optimization to a fully adaptive self-optimizing construct. 3GPP Self-Organizing Network (SON) is one example of such a self-optimizing behavior already in place for 3GPP RAN and HetNet. The Intelligent Heterogeneous Network Controller takes it to the next step by cross-optimizing the 3GPP RAN, HetNet, Transport, and Core functions with a Multi-Layer SON enabling the entire multi-access edge fabric 306 to be self-optimizing.

The end-goal is to optimize across each of these fabrics with a higher level SDIDA function, an AI function that operates within and across each fabric. For this, a multi-layer optimization fabric 308 is needed. The multi-layer optimization fabric 308 brings multiple autonomic systems together in a fully coordinated, federated manner. It does this in a way where the sum of all the parts is greater than the individual contributions of each fabric. The multi-layer optimization fabric 308 can cross-optimize multiple fabrics, systems, and components in a logical "fabric of fabrics."

the Distributed Computing Dilemma

Computing power has evolved exponentially over the last several decades, following Moore's Law, and applications' demand and complexity have grown alongside that. We've reached the point where somewhat mundane applications require storage and compute beyond the capability of a single workstation. While compute and storage have seen continuous performance improvements, the networks required to connect off-server components have not. As a result, high powered computing and massive storage see the network as a bottleneck.

The network is an intricate part of distributed computing. As application tasks have grown increasingly complex, the edge of the network has become the computer. For distributed computing to keep up with its demands, the network must allow the interconnection of these resources with minimal latency and overall optimization. This is part of what SOF, leveraging 5G, intends to solve.

Cloud Service Providers have built spine/leaf (folded Clos) architectures in their data centers to ensure any-to-any connectivity. Although this may be true, the required amount of bandwidth is not always available, and the latency incurred during a remote procedure call is not always low enough. In addition to this, operationally, a different type of networking hardware with different versions of network operating systems makes the job of designing, building, and operating a distributed compute platform even harder.

The solution to these problems entails:

1. A common set of hardware that can scale up and scale down regardless of where in the network it is deployed; and 2. A high bandwidth, low-latency interconnect fabric that grants access to all the resources required to complete a task.

Solution #1 requires a Networking Operating System (NOS) that is modular, microservices-based, and cloud-architecture based. By leveraging modularity and microservices, only the functions that are required can be compiled into the NOS to make it as efficient as possible. Not only should this operating system be capable of running on a single device and operating in a distributed manner, but a higher-order Fabric Operating System (FOS) must also be able to operate across devices.

Solution #2 requires the latest 5G principles of massive bandwidth with ultra-low latency, across both wireline and wireless architectures.

With these two solutions in place, SOF will now have the ability to interconnect and coordinate the resources in a seamless fabric-of-fabrics.

Communications and 5G systems continue to evolve, bringing about an unprecedented level of interconnectivity, so much so that the network will become invisible. 5G will move forward with disaggregation and cloud-native architectures, creating a complex, intertwined ecosystem of components. These components will need to be distributed closer to Access Edge for latency aware distributed parallel processing. Groups of these components will comprise an Infrastructure Fabric, a Multi-Access Edge Fabric, a Service Management Fabric, and a Digital Marketplace. Tying together these fabrics will be a Multi-Layer Optimization Fabric, capable of ensuring all the fabrics work together in harmony to achieve a common business goal. This entire system will be a fabric of fabrics, the Self-Optimizing Fabric, which will be self-regulating, self-organizing, and self-optimizing.

Complexity and the Component-System Pattern

Figure 21:
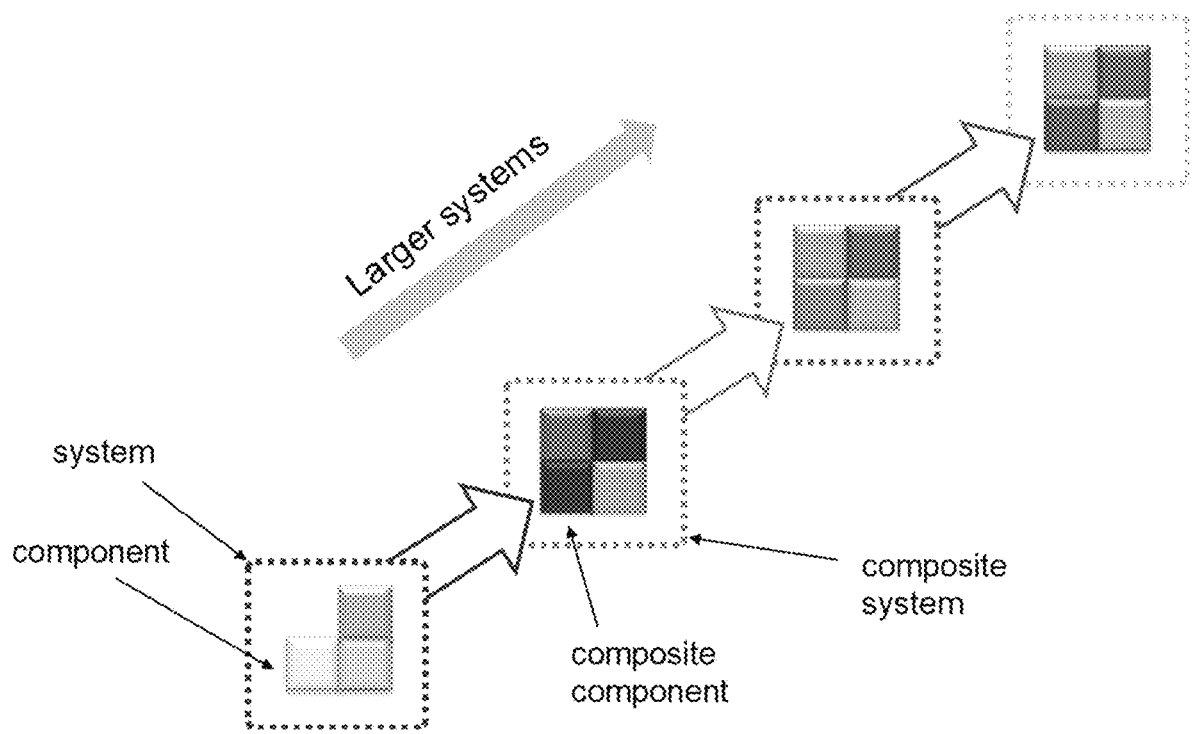
FIG. 21 is a diagram of a component-system pattern.

FIG. 21 is a diagram of a component-system pattern. Complexity arises from the nature in which cloud systems (and other networking, computing, and storage systems) are built. Most functions are aggregations built from smaller components, which in turn become aggregations of functions themselves. Take, for example, an Ethernet switch with 200 Gbps interfaces. At its base level, transistors are assembled to produce circuit boards. Add to that optical components and lasers, and the interfaces to generate high bandwidth is created. Those interfaces are connected to a backplane that allows data packets to be switched, and software governs the entire switching system. This describes the component-system model, where complex functions are built up from smaller building blocks of functions aggregated together.

The purpose of the component-system model is to abstract and hide complexity. This concept is present in many systems, and a good example is the human body. At the lower levels are collections of nerves and tissue, that operate under local control. These are involuntary actions and reflexes. Those systems are controlled by the brain, divided into sense functions (telemetry collected by the body) and motor functions, actions that cause the body to move in a certain way. The brain helps keep the local systems functioning in harmony.

The point is that higher-order functions need only be exposed to a relatively small, manageable set of interfaces to the layer below them. Another example is a Heating, Ventilation, and Air Conditioning (HVAC) company that wants to offer a thermostat system in a building. At its lowest layer, connectivity can be provided via wireless technology (3G, 4G, 5G, Wi-Fi) or wired technology (Cat 5 or 6 copper cabling), but the overall service does not care about the specific technologies used to deliver those specific functions. All of that complexity is abstracted into a "connectivity" function supplied by one or more providers, in one or more ways.

Self-Assembling Network Use Case

In an embodiment, a Distributed Fabric Daemon (DFD) can be an implementation of the SOF 30, and the SDIDA pattern described herein to form a dynamic wireless network, or generally a self-assembling network. For example, the DFD may be used on any interconnected devices, be they stationary or mobile, hard-wired, or connected wirelessly. The 5G emergency network is used as a reference example to introduce many of the DFD's operating principals.

In this example, disaggregation is used below to signify that the components of a DFD may run in the same execution space (process) or different execution spaces (processes) on one or more compute devices. In an embodiment, the present disclosure can include a multi-layer optimization across a full edge node stack, and autonomic creation, placement, and control of devices to form a mesh network created by stitching multiple edge nodes (full-stack, or partial stack edge nodes) together using distributed architectures such as Recursive Internetwork Architecture (RINA), Transmission Control Protocol (TCP)/Internet Protocol (IP), or other networking technologies.

The fully distributed and disaggregate-able control and management system software will automatically discover peers to form a meshed network (fabric). The software runs on each component of the fabric compute, store, connect, sensors, actuators. The software running on each component (with the exception of the Device Abstraction Layer (DAL) is identical. Here, the domain is each node, e.g., each flying node. The disaggregate-able nature of the software enables it to run on minimal resource-constrained devices. The automatic and continuous adjustments to routing, link topology, physical topology (node positions), and User Equipment (UE) affinity to a node to maintain policy defined bandwidth and Quality of Service (QOS) for specific users. This approach supports the ability to swap in/out nodes, add new nodes, or remove existing nodes, and all operations are hitless to UE traffic passing through the ad-hoc wireless network.

Existing Wireless Networks

Wireless networks generally include one or more access points (also referred to as base stations, nodes, etc.) that wirelessly connect to one or more User Equipment (UE) for wireless access. The access points also connect either wirelessly and/or wired for backhaul for network connectivity. Examples of wireless networks include Long Term Evolution (LTE), 5G, Wi-Fi, etc. Further, the network architecture of a wireless network can be a mesh topology or a so-call wireless ad hoc network. A network is ad hoc because it does not rely on a pre-existing infrastructure, such as routers in wired networks or access points in managed (infrastructure) wireless networks. Instead, each node participates in routing by forwarding data for other nodes, so the determination of which nodes forward data is made dynamically based on network connectivity and the routing algorithm in use.

Even further, there are implementations where wireless nodes are in flight, e.g., via balloons, Unmanned Aerial Vehicles (UAVs) (i.e., drones), etc. There are many examples of flying wireless nodes, but in all cases found, these nodes are relatively stationary because they are tethered to the ground for power (in the case of a drone) or the position (in the case of a balloon). This severely limits the ability of the flying node to adapt to the demands on the network, such as clustering of users requiring more dense coverage in some areas but not in others.

There are also many examples of ad-hoc wireless networks of both fixed nodes and more recently flying nodes. These ad hoc networks are pretty static. That is, they form a mesh with their neighbors, which remains relatively static. Most are based exclusively on link signal strength and are in no way tied to the wireless users of the network. That is, links are independent of the users, which is disadvantageous in meeting QoS requirements as users cluster or disperse throughout the network.

What has yet to be explored is a wireless network with flying (selectively movable) nodes (i.e., access points, base stations, etc.) that have a variable position. This is addressed herein.

Self-Assembling Network

Figure 22:
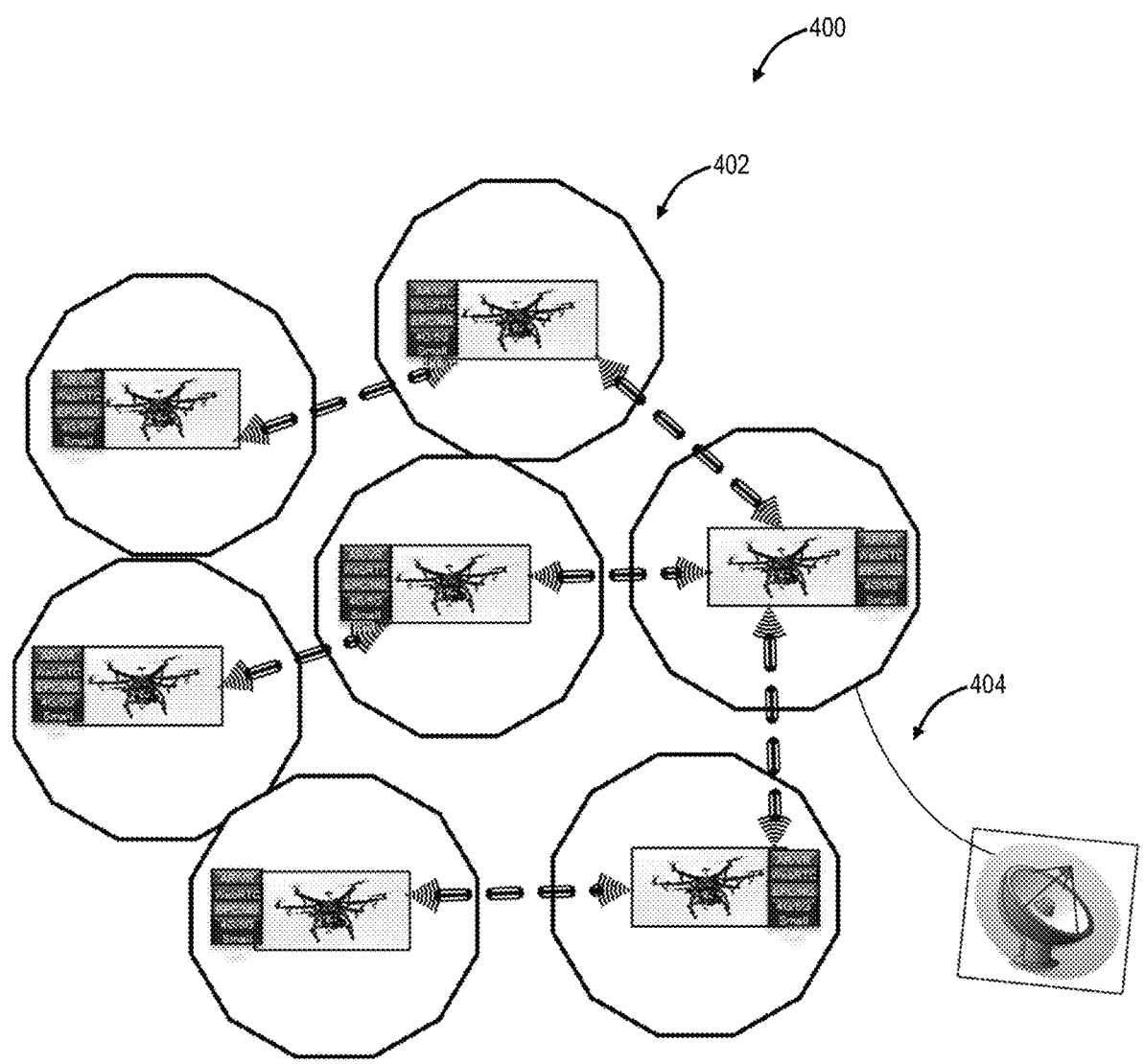
FIG. 22 is a network diagram of a self-assembling wireless network.

FIG. 22 is a network diagram of a self-assembling wireless network 400. The self-assembling wireless network 400 includes a self-assembling grouping of flying wireless nodes 402 (e.g., LTE/5G edge nodes, access points, etc.). The network can assemble in as efficient a configuration as possible, including rerouting around failed nodes, adjusting topology to handle loads including the movement of nodes, etc. One or more of the flying nodes can include a fiber tether and/or satellite uplink 404 for backhaul. In an embodiment, the flying wireless nodes 402 can be drone-based. In another embodiment, the flying wireless nodes 402 can be a balloon. In either embodiment, the physical location of the flying wireless nodes 402 can be adjusted as part of the network optimization/self-assembly.

The flying wireless nodes 402 can be "flying base stations," but functionally, these are flying 4G/5G Edge nodes, i.e., 4G/5G small cell+thin Evolved Packet Core (EPC)/Next Generation Core (NGC)+Web Real-Time Communication (RTC), a full-stack Mixed Reality App. Ideally, a self-contained edge node that is capable of serving end-to-end (e2e) Multi-hop Relay (MR) flows.

Traditional LTE and soon to be 5G networks have antennas at fixed locations that are placed during the deployment of the wireless network. Deploying these antennas takes time and planning to ensure that they are placed correctly to ensure adequate coverage for all users.

In a disaster situation where power and possibly telecommunications have been disrupted, the need for a functioning mobile network is greater than ever. In addition to the persons affected by the disaster, the network enables first responders to communicate with coordinators and specialists such as doctors or civil engineers.

The present disclosure describes the software control system(s) that allow a fully functioning LTE or 5G access network (or another type of wireless network such as Wi-Fi) to be rapidly deployed in disaster areas to re-establish communications for the victims as well as first responders. The software control system enables the deployment of LTE or 5G edge nods capable of autonomous motion. This motion can occur in either two or three dimensions. In the case of two dimensions, the edge node can be on wheels, tracks, or floating on a body of water such as a swamp, lake, river, or ocean. In the case of three dimensions, the edge node can be in a balloon, blimp, helicopter, or drone. One or more of the edge node(s) is(/are) tethered via fiber for a mechanism that connects it to the outside world (backhaul). This can be achieved via a satellite link or possibly through some remaining functional telecom infrastructure in the impacted area.

The control software operates on multiple dimensions to assemble an ad-hoc wireless network between the edge nodes adjusts the edge node positioning and network topology to optimize the use of resources.

Self-Assembling Network Optimization

Figure 23:
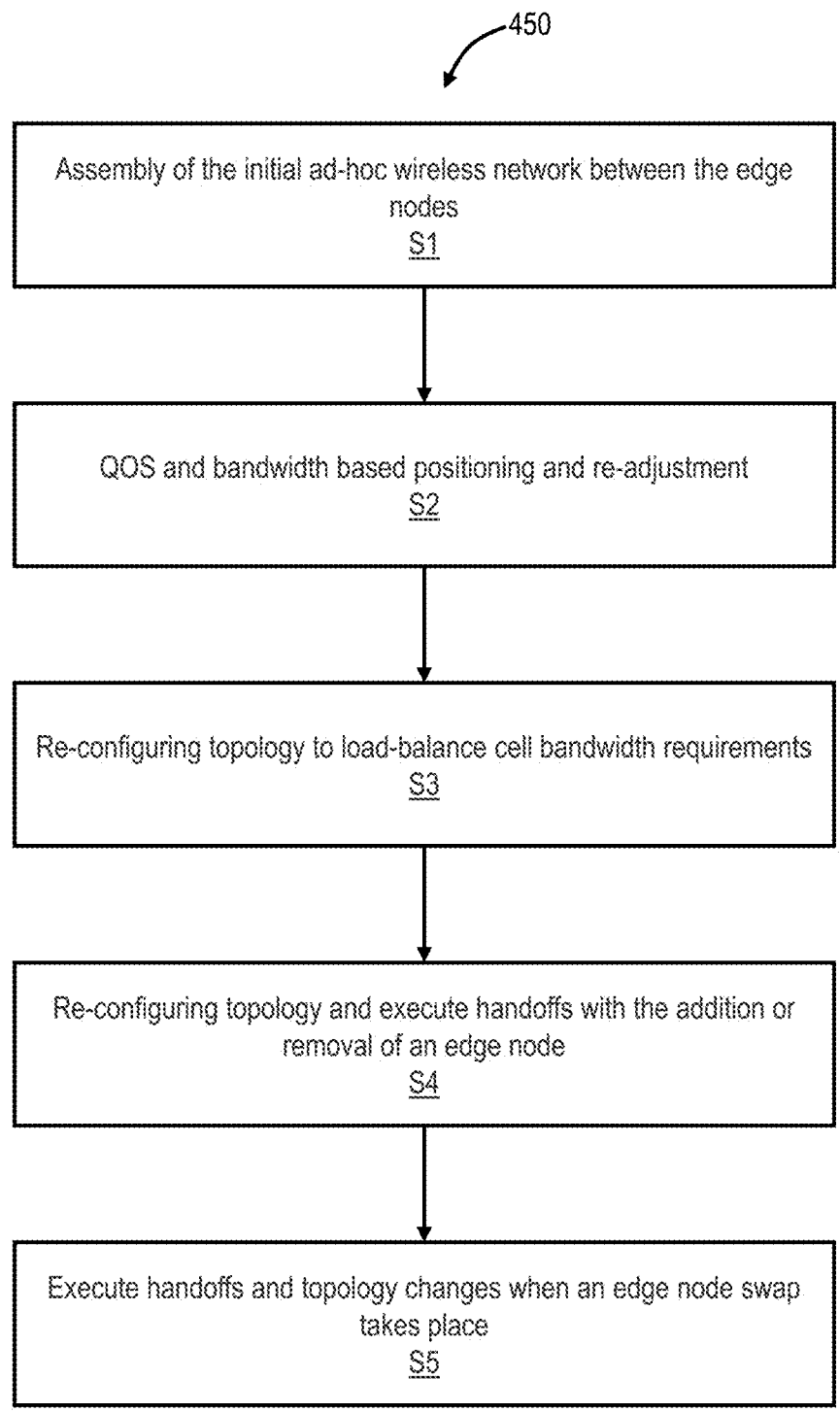
FIG. 23 is a flowchart of a self-assembling network optimization process that the control software executes for the self-assembling wireless network.

FIG. 23 is a flowchart of a self-assembling network optimization process 450 that the control software executes for the self-assembling wireless network 400. The self-assembling network optimization includes assembly of the initial ad-hoc wireless network between the edge nodes (step S1), QOS and bandwidth based positioning and re-adjustment (step S2), Re-configuring topology to load-balance cell bandwidth requirements (step S3), Re-configuring topology and execute handoffs with the addition or removal of an edge node (step S4), and Execute handoffs and topology changes when an edge node swap takes place (step S5). Also, network slicing can be used as a mechanism for the segregation of bandwidth so that critical users get a secure and reliable allocation.

For step S1, assembly of the initial ad-hoc wireless network between the edge nodes, the control software works to establish a meshed wireless network between the edge nodes taking multiple factors into account including the signal strength of all reachable neighbors, the desired span of the network, and the redundancy requirements of the mesh. This might require the edge nodes to move into a position to ensure adequate signal strength for wireless neighbor connections as well as providing the required span of overall cellular coverage.

The control software is established as part of establishing a mesh. The specific control structure, including the degree of autonomy and levels/peerings of control, will depend upon the specific scenario both in terms of the characteristics of the self-assembling wireless network 400 and in terms of the capability of the flying nodes 402, etc. This may evolve as the disaster evolves. Further, the flying nodes 402 can include reconfigurable hardware such as FPGAs as well as software. Here, the flying nodes 402 can be upgraded or modified, e.g., communications, sensors, video processing, etc.

The establishment of the self-assembling wireless network 400 is just part of the ongoing demand response process. The establishment is driven by demand intent as well as active demand. Note, this description is in terms of apparent phases, but the control software may include uniform treatment across all behaviors.

For step S2, QOS, and bandwidth based positioning and re-adjustment. The self-assembling wireless network 400 users can have different policies. For example, a first responder would have a high priority and possibly a higher bandwidth allocation than a regular user. Should the self-assembling wireless network 400 not be able to deliver to the user's policy as the user starts to push toward its limits, the control software will either re-position the edge nodes or change the topology or a combination of the two to ensure that the user's policy is met. In a disaster area, this could be a first responder trying to provide live streaming video of an injury to a remote doctor, all while receiving instructions on how to deal with the wound.

Individuals could use an app on their UE to provide predicted needs to enable the network to prepare. Users could be given warnings via the app about the degradation of coverage (both future prediction and actual current). Also, users may include other flying nodes 402 or drones. For example, drones may provide sensors giving information to first responders on radiation levels, toxicity, etc. may also use the same high capacity network and may be coordinated as part of holistic network deployment.

For step S3, re-configuring topology to load-balance cell bandwidth requirements, there may be more users in certain areas, causing a strain on communication resources. In this case, the control software may do any, some, or all of the following: Additional wireless links are established between other neighbors, more edge nodes are moved into the area essentially dividing UEs between all edge nodes moved into range, or/and, traffic is routed through more than one fiber tether if available. A drone may provide compute capability to a neighbor. Compute at the right place should be used (own, neighbor, base station, data center, etc.).

For step S4, re-configuring topology and execute handoffs with the addition or removal of an edge node, the addition of an edge node can occur when there is a need to expand the coverage of the cells or to increase the density to support more users. The control software will react to the addition of a new edge node by altering the physical locations of all edge nodes as well as the link topology to optimize the use of the resources based on the current users and historical user trend. The removal of edge nodes can occur either as a planned event as existing infrastructure begins to come back on-line or as an unplanned event as a result of a failure. In a planned event, the control software executes handoffs of existing users to the most suitable edge node, and then the control software re-configures the ad-hoc wireless network topology to remove the edge node from the mesh. In the case of a disastrous removal of an edge node, the control software will remove the failed edge node from the mesh and possibly move other edge nodes to minimize gaps in cell coverage.

Depending upon the scenario, the drones, etc. may need threat/danger detectors/instrumentation (fire, chemical, radiation, hostiles) and may respond autonomously to move to a less threatening/dangerous position while balancing coverage. This may require/cause/coordinate other moves. A more hardened drone may need to move into place. The control software deployment will evolve with the evolving configurations. Drones may monitor neighbors and warn each other of dangers.

For step S5, execute handoffs and topology changes when an edge node swap takes place, this case applies mostly to situations where the edge nodes are airborne using drones. When drones are used to position the edge nodes, it is usually most convenient to tether them to a ground-based power supply. If the deployment is large enough that a drone only needs to make small adjustments in its position, then tethering works. In the case where tethering is too limiting or near impossible, another solution is required. The control software provides a mechanism for handing off users from a departing edge node to an arriving edge node by establishing connectivity between the arriving edge node and the remainder of the self-assembling wireless 400 and then performing wireless handoffs of all connected users from the departing edge node to the arriving edge node. Once this is completed, the control software guides the departing edge node to replenish its fuel supply, making it ready and available to be swapped into service when another edge node runs low on fuel.

A need to depart may relate to fueling or exposure to hazardous materials or due to some other form of damage. The telecoms drones could also deliver items during their repositioning (depending upon their configuration).

For example, the control software monitors the following on to optimize the network continuously:

Positions of the UEs. This can be accomplished using Global Positioning Satellite (GPS) onboard the nodes and the UEs. If GPS is not available in the UE, then an approximation is made using simple signal strength triangulation.

Positions of the nodes 402. This can be achieved by using GPS. If the disaster is significant enough that GPS is not available, the nodes 402 can use a peering protocol that includes signal strength and transit times to approximate the distances as well as proximity sensors if the range will accommodate them.

Bandwidth and QOS requirements of the UEs. Each UE has a Bandwidth and QOS policy that needs to be maintained.

Further, for example, the control software takes the following actions based on the data above to maintain the optimized state of the network.

A node may be moved to a different position to improve signal strength with either its peer(s) or a specific UE.

New links may be established, and/or others torn down to balance flows through the network.

Dynamic adjustments to routes being taken by different flows to optimize the use of resources UEs may be dynamically handed off from one node to the other to better balance the use of resources. These handoffs are not necessarily based on the traditional mechanism used in current wireless networks to handoff a UE to a different node because of the users' trajectory.

Example Drone

Figure 24:
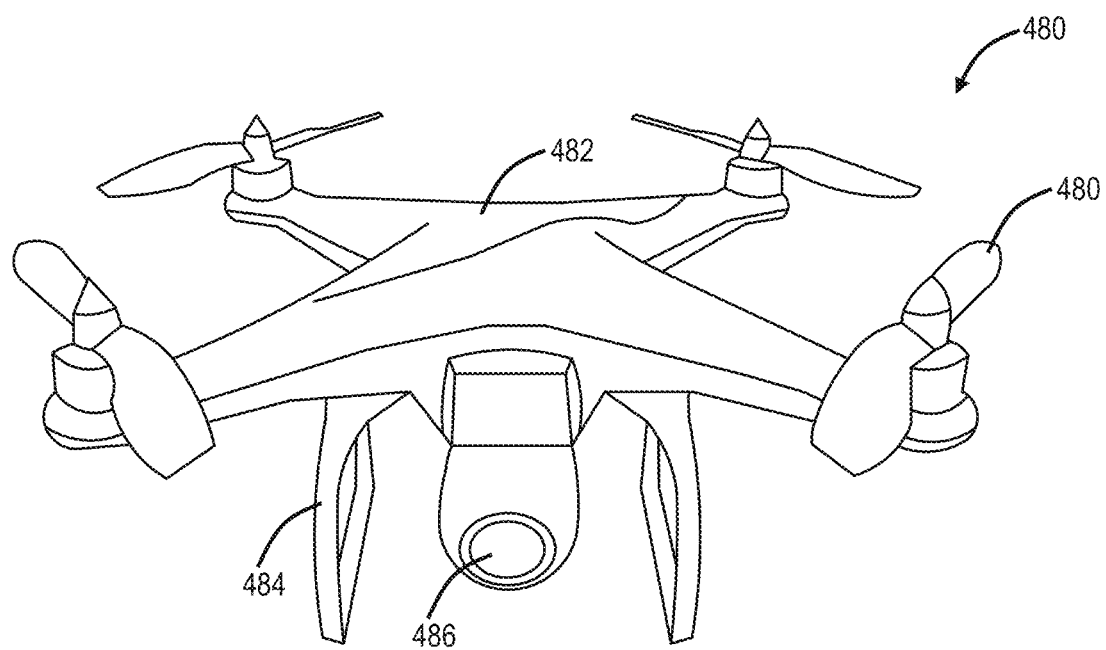
FIG. 24 is a perspective view of an example drone for use with the systems and methods described herein.

FIG. 24 is a perspective view of an example drone 480 for use with the systems and methods described herein. The drone 480 may be a commercially available UAV platform that has been modified to carry specific electronic components as described herein to implement the various systems and methods. The drone 480 includes rotors 480 attached to a body 482. A lower frame 484 is located on a bottom portion of the body 482, for landing the drone 480 to rest on a flat surface and absorb impact during landing. The drone 480 also includes radio(s) 486, which are used to provide wireless connectivity. The drone 480 includes various electronic components inside the body 482 and/or the radio(s) 486 such as, without limitation, a processor, a data store, memory, a wireless interface, and the like. Specifically, it is expected that the drone 480 can be bigger and more advanced, capable of carrying significant loads, including data processing equipment in addition to the radio(s) 486.

These various components can be similar to those described with reference to a processing device 100. Those of ordinary skill in the art will recognize the drone 480 can include similar components to the processing device 100. Further, UEs can have an architecture similar to the processing device 100.

In an embodiment, a plurality of flying nodes each having one or more radios for wireless access and at least one node being connected for backhaul; and control software executed in a distributed manner amongst the plurality of flying nodes, wherein the control software is configured to monitor positions of User Equipment connected to the plurality of flying nodes; monitor positions of the plurality of flying nodes; monitor bandwidth and Quality of Service (QOS) requirements of the User Equipment; and perform adjustments to the self-assembling wireless network including, e.g., moving a node of the plurality of flying nodes to a different position; add/remove links to balance flows in the network; dynamically adjust routes in the self-assembling wireless network; and dynamically handoff User Equipment between the plurality of flying nodes.

In an embodiment, the adjustments include the addition or removal of a node of the plurality of flying nodes. For example, the plurality of flying nodes may include drones that require refueling periodically. The addition or removal of a node is performed in a hitless manner from the perspective of corresponding User Equipment.

In another embodiment, a control system includes a processor and memory storing instructions that, when executed, cause the processor to monitor positions of User Equipment connected to the plurality of flying nodes; monitor positions of the plurality of flying nodes; monitor bandwidth and Quality of Service (QOS) requirements of the User Equipment; and perform adjustments to the self-assembling wireless network including, e.g., moving a node of the plurality of flying nodes to a different position; add/remove links to balance flows in the network; dynamically adjust routes in the self-assembling wireless network; and dynamically handoff User Equipment between the plurality of flying nodes.

In a further embodiment, a non-transitory computer-readable medium includes instructions that, when executed, cause a processor to monitor positions of User Equipment connected to the plurality of flying nodes; monitor positions of the plurality of flying nodes; monitor bandwidth and Quality of Service (QOS) requirements of the User Equipment; and perform adjustments to the self-assembling wireless network including, e.g., moving a node of the plurality of flying nodes to a different position; add/remove links to balance flows in the network; dynamically adjust routes in the self-assembling wireless network; and dynamically handoff User Equipment between the plurality of flying nodes.

Distributed Fabric Daemon

Traditionally with SDN, network management and control have been implemented using a centralized controller (i.e., the SDN controller). The DFD (Distributed Fabric Daemon) takes a different approach to implementing management and control as a distributed application targeted at running on devices that are used to make up a fabric to deliver services.

Devices that can make up a fabric are:

Connect device: A connect device provides connectivity between other devices required for an end-user's service, a connect device can be a switch, router, VNF, radio link, infrared link, Bluetooth, Wi-Fi, and others.

Compute device: A compute device provides a platform for running arbitrary code that provides a function or functions related to or in support of an end-user service. Sensors (cameras, temperature, etc.) and actuators (motors, solenoids, valves, switches, etc.) fall in this category, which encompasses autonomous vehicles. The processing device 100 is an example compute device.

Store device: A store device provides non-volatile storage for data related to an end-user service. Compute and store devices may reside in the same chassis, such as the processing device 100.

The DFD (or part of a DFD, more on this later) runs on each of the devices available to create end-user services. The resulting devices+DFDs form what we refer to as a fabric, i.e., the SOF 30. Any DFD in the fabric can receive a request to create a user service. The DFD that receives the request relies on its peer DFDs to help find the resources required to create the service and subsequently configure the service on each of the devices that have been selected to deliver the service.

The Distributed Fabric Daemon (DFD) is software made up of multiple components. The software is started on each device that is to make up the fabric that will deliver services. The device(s) can be compute devices, storage devices, connect devices (networking), sensors, and actuators. During each phase of operation, the DFD performs (but is not limited to) the following:

During software startup/initialization the following (although not limited to) is performed:

1) Loading of policy and rules: Initial policy and rules are. The rules and the policy will dictate the behavior of the DFD.

2) Peer discovery: The software will discover all its peer DFDs and build a table of what interface on the device can be used to reach each peer. This is referred to as the peer table, which is stored in a Resource Information Base (ReIB). Note that in wireless networks such as the use case presented here, the policy will ensure that signal strength is taken into account and the fabric is formed such that a peer that is indirectly accessible through another peer with strong signals on both links is not also directly accessible over a much weaker direct radio link. This ensures each wireless link will have the best possible performance. The peering process relies on the functionality of the underlying network and can use protocols such as broadcast or multicast for IP, Distributed IPC Facility (DIF) for RINA, or others. Once peers are discovered, the DFDs will establish a dialog with their peers using a client/server model and a point-to-point connection which can be achieved using gRPC, Representational State Transfer (REST), Hypertext Transfer Protocol (HTTP), Cask Data Application Platform (CDAP), but not necessarily limited to those. Of note, the DFDs do not need to know about each other, the entire fabric is self-discovering.

3) Latency and continuity checking: Once peering is completed, each DFD starts exchanging messages with each of its peers to measure latency between the DFDs and to ensure that connectivity is up. These messages are small and frequent (frequency is determined by policy) with timestamps used to calculate a rolling average of the latency. If more than a certain number of these messages are missed (determined by policy), the peer is marked as unreachable until such time that the message exchange resumes.

4) Resource discovery: The DFD then uses the device abstraction layer to probe the device for capabilities and resources. The DFD then shares this information with all of its peers, which then share it with all of their peers recursively and in parallel. Loop detection and other mechanisms are in place to prevent the shared information from being circulated indefinitely. The information shared with peers depends on the device type but can include but is not limited to:

Compute: number of CPU cores, amount of RAM, amount of disk, supported container types such as Virtual Machines, namespaces (container/docker), number of interfaces, interface speed, GPUs, and other resources the compute may have such as FPGAs, smart NICs, sensors, actuators, etc. . . . etc.

Store: the size of the available storage, redundancy type (RAID 1,5, and others), allocation block size, transfer rate, access methodology (iSCSI, NFS, SAMBA, and others).

Connect: Number of interfaces, bandwidth per interface, address per interface, latency to peers, utilization, and networking type (IP V4, V6, RINA, etc.).

Sensor: What the sensor can sense, location, range, etc.

Actuator: What the actuator can move/activate the location, etc.

5) Resource summarization: Once all resource information has been shared, each DFD will summarize the resources it can reach through the peers retaining only the next hop on the shortest path to any given resource. Identical resource types will be collapsed into one entry per next-hop per resource type, per ingress interface. Note, each DFD only retains the next hop to get to a specific resource type.

The DFD is now ready to receive requests to set up services. The policy determines the "language" of the service request it can be Topology and Orchestration Specification for Cloud Applications (TOSCA) or any other service description language up to and including natural language. The requests can be made on any of the DFDs in the fabric. The DFD performs the following when it receives a service request:

1) Dissection of the service request into individual resources, a connectivity graph between the resources, and the Key Performance Indicators (KPI(s)) (metrics) associated with each resource and connection.

2) The dissected request is handed off the Composition Computation Engine (CCE), which then searches for resources that will meet the KPI(s) for both connectivity and the resource capabilities (bounded by any policy). It proceeds as follows:

a. The CCE picks a starting resource; although this can be any resource in the request, the most deterministic is to pick one that is "fixed," such as the resource (device) with the interface the client (end-user) connects to. This is not mandatory; however, it is a useful heuristic to optimize the searches.

b. Using the connectivity graph, the CCE determines what resources need to connect to the currently selected resource and starts a parallel recursive breadth-first search beginning at the selected resource guided by the resource tables built earlier. This is accomplished by making a recursive search function call to each peer based on the resource table and hop latency and waiting for all the searches to return before returning to the calling DFD. Since each parallel search is handled by different DFDs on different devices, the loading of any one device is minimal. The search proceeds through the DFD graph in a fully parallel and recursive way; the resource requirement for this search is distributed among all DFDs participating in the search. Parallel execution is commonly referred to as threads (either simulated or real), and recursion is usually a function calling itself (in this case itself within a peer DFD).

c. If the connectivity between a DFD and its peer does not meet the KPI for the connection (missing bandwidth, latency too high)—or—if the sum of the latencies from the start of the search to a target resource exceeds the KPI then regardless of the resource table entry, that peer is skipped.

d. Resources meeting or exceeding the KPI(s) has an ephemeral reservation placed on them.

e. Once all parallel searches return with their reserved resources and path information (latency and hops). The CCE will select the best fit and release other ephemeral reservations.

3) The same process described at 2) is now launched from each found resource to locate resources directly connected to them (it) until all resources have been found and temporarily reserved.

4) The CCE then makes parallel requests to all the DFD's that control the resources to make the reservation permanent, configure them, and stitch the service over a VPN (the term VPN is used in the logical sense that is: a Virtual Private Network) and the mechanism depends on the underlying network technology. Note, the overall service is not stored in a central location, each DFD knows that it contributes (a) resource(s) to a service and the KPI(s) that must be maintained.

Once the service is configured and stitched (up and running), each DFD starts monitoring the portion(s) of the service that is (are) using the DFD's resources for compliance to the KPI(s). Should any resource or inter-resource connection begin missing, it's KPI the CCE is re-launched with the impacted resources to find an alternative than a make before break algorithm is used to stitch in the new KPI compliant resource(s). In the case of mobile nodes, there is an additional degree of freedom the CCE and employ, and that is to request that a node move closer to another to re-establish a missed connect KPI (if the signal strength is an issue).

A DFD is virtually stateless in that it can recover its service if it restarts. The only component that cannot quickly be recovered (the active service information) is shared with all of its peers and stored in the peer REiBs to allow the DFD to recover this on a restart. The information can also be written to the filesystem of the device.

The introduction of a new device with DFD results in the startup process being initiated on the new device, and once complete, the new resource with its DFD becomes part of the fabric. The removal of a device is handled by informing peers that the device has no resources (which is propagated recursively to other peers). The device can then be disconnected from the fabric. Note that services running through the device must be moved or terminated before the device is instructed to remove itself.

Figure 25:
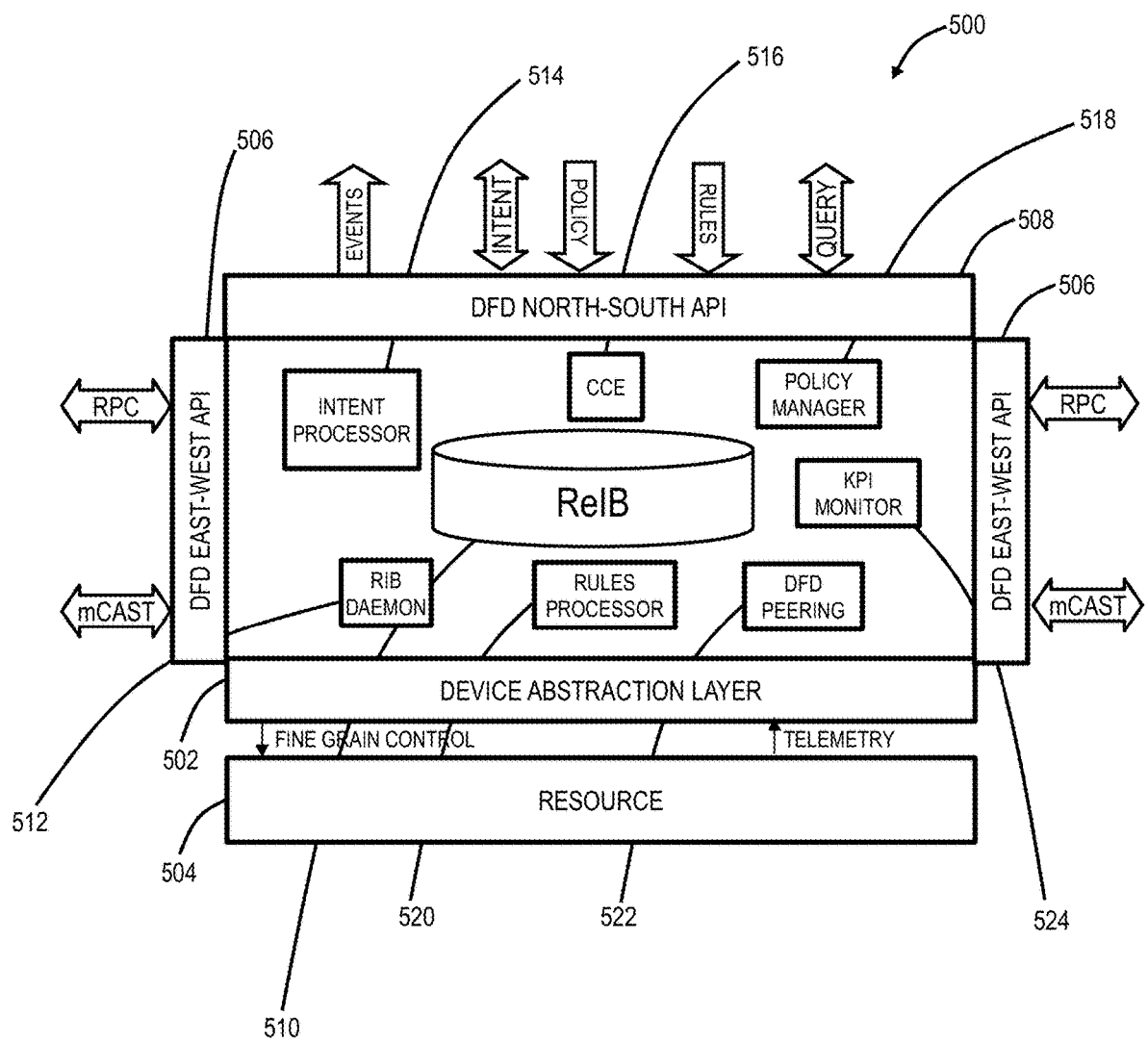
FIG. 25 is a block diagram of an example Distributed Fabric Daemon (DFD)
Figure 26:
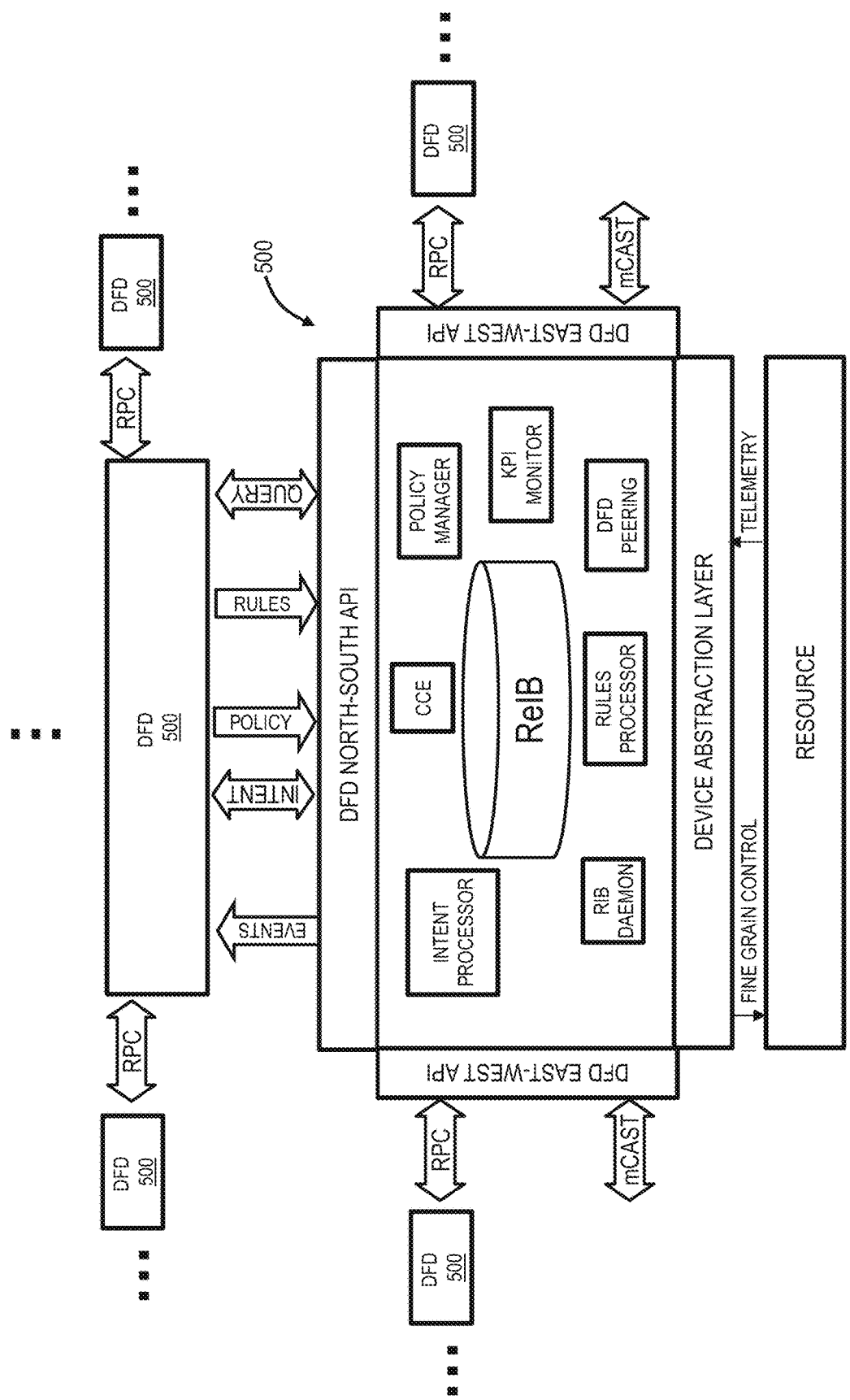
FIG. 26 is a block diagram of hierarchical recursive connectivity between the DFDs.

FIG. 25 is a block diagram of an example Distributed Fabric Daemon (DFD) 500. FIG. 26 is a block diagram of hierarchical recursive connectivity between the DFDs 500. FIG. 26 illustrates some possible connectivity between the DFDs 500, although not all forms of connectivity may be present in all cases. In a simple case of a single flat fabric, there are only east/west links. In a more complex recursive collection of fabrics, there is also hierarchical recursive connectivity between the DFDs 500.

The following is a brief description of each of the DFD's 500 components/

A Device Abstraction Layer (DAL) 502 presents a consistent interface northbound to the DFD 500 abstracting the underlying resource(s) 504. It allows the DFD 500 to discover how many degrees of freedom it has with the device to adapt to conditions that may impact KPIs. The DAL 502 allows the device to send events that are then normalized for the DFD 500 to capture and use. The DAL 502 also allows the DFD 500 to send configuration commands (that have been normalized) to the DAL 502, which it converts to device-specific commands.

An East-West API 506 is structured to allow initial discovery of peers and to subsequently transfer information or invoke functions on peer DFDs 500. The discovery mechanism can be an xCast protocol including but not limited to multicast, broadcast for IP, and a discovery DIF for RINA and any community of interest style protocol for other networking technologies. The mechanism for information transfer and function invocation can be any form of Remote Procedure Call (RPC), including but not limited to gRPC, NIX RPCs such as those used for NFS, or the CDAP protocol for data transfer and remote method invocation.

A North-South API 508 is the API whereby external processes and users interact with a DFD 500. The API 508 includes but is not limited to the following:

Event streams, these are events that an external process has expressed interest in they are the normalized events from the DAL 502 but can also be raw events from the device if the process so chooses.

Query API allowing authorized processes to query the ReIB's data.

An intent API used to request a service from the fabric; the API is bi-directional since it returns a structure that represents the configured service, including but not limited to the DFDs 500 participating in the service as well as the configurations of the underlying devices.

APIs allowing divers DFD 500 configuration(s) to be set. This includes but is not limited to policy, rules, and other DFD configuration.

A ReIB 510 that stores all DFD configuration and operational data including but not limited to the rules, policy, peer table, resource locater table, active services, and configuration. The ReIB 510 has a process for distributing shared state to other DFD's (the ReIB daemon). That is currently (but not limited to) active services for recovery from re-starts. The ReIB 510 is a fully distributed database that represents the fabric, the resources available within the fabric, and the services running on a or a combination of resources within the fabric.

A ReIB Daemon 512 has primary responsibilities to coordinate with other ReIB daemons within the DFD graph on the exchange of shared object information and state and to provide a query capability.

The daemon 512 can use any suitable protocol for shared object information transfer (gRPC, REST, CDAP, etc.). The daemon 512 attempts to optimize the transfer of and access to the RIB objects to maximize the efficiency of data location and availability.

An intent processor 514 decomposes a request into a series of composition computation engine requests. Using CCE 516, the intent processor 514 provides results update the ReIB 510 to reflect the desired end-state. The ReIBd (ReIB database) will propagate any shared objects required to achieve the end state. Using this end state, each of the management agents (Resource Abstraction Layer) make the required configuration changes to the resource.

The role of the CCE 516 is to use the resource locater table and rules engine to find the best fit resource for the translated intent request. The CCE 516 carries a payload of the resource type and KPI information. A parallel recursive breath-first search through the DFD graph is performed, applying the rules at each hop. The rules are one of the mechanisms for altering the behavior of how resource allocation gets performed. If the rules apply successfully (a match), the resource meeting the KPIs is declared found, and the ReIB 510 updated and propagated.

A policy manager 518 acts primarily on the policy objects maintained within the ReIB 510. It ensures that all actions performed by the other components such as the CCE 516, Intent engine, etc. are within set policy. Policies may set attributes such as maintaining reserve capacity, maximum allocation boundaries, maximum allocation duration, and many more. During a CCE search, rules match with a subsequent policy failure is not considered a match. The policy manager 518 provides an external AI framework, an additional point of influence over the DFD's 500 behavior.

A rules processor 520 executes a rule set on provided data and takes actions based on rule matches. Data can be anything from actions to CCE payloads. Actions can also be anything from changes to the ReIB 510 to alteration of the initial match data. Manipulation of rules and actions (create update delete, list) is done through the ReIBd and is reflected in the ReIB 510. Rules and actions are manipulated to change the behavior of the DFDs 500. The rules processor 520 performs both forward and backward chaining to handle rules that rely on other rules' actions.

DFD peering 522 uses policy information and neighbor data to establish a graph of DFDs 500. This virtual graph of connectivity determines how routing is performed during a CCE search. The "mesh-ess" and potential recursive hierarchical organization of the graph can be influenced by many factors, including policies, the number of DFDs 500 in the jurisdiction, the organization of the underlying resources, and others. Changes to the policy may trigger the DFDs 500 to perform a re-organization of the graph and all the related ReIB objects.

A KPI monitor 524 monitors the resource(s) for each service supported by the device controlled by the DFD 500 for compliance to the required KPI. Here, the KPIs can be the service requirements, e.g., latency, cost, bandwidth, etc. If a KPI cannot be met, the KPI monitor 524 will attempt to find a replacement resource. If a resource is available locally, it is used instead of the faulty one. If a resource is not available locally, a request to recompute the service is made to the CCE 516, and differences between the new and old are applied as hitless as possible (make before break).

Disaggregation Ability

As alluded to earlier, the DFD 500 is fully disaggregate-able, allowing it to be used on small IoT devices such as sensors and actuators that may not have the resources to run the entire set of components that make up the DFD 500. The disaggregate-ability will allow only the strict minimum of components to run on the device and the remainder of the components to run on a nearby server. The disaggregate-ability enables the following for a DFD:

It can run in a single process space or multiple process spaces depending on requirements.

It allows a smaller footprint on small devices (IoT sensors, drones, etc.).

Only the peering and the device abstraction layer need run on the target device.

The remainder of the DFD can run on a nearby server or servers, depending on the extent of disaggregation.

The disaggregation technique is:

Each component within the DFD runs as a server process and also acts as a client of other components running as server processes Each component has a well-defined API (gRPC, REST, CDAP, or other), and functions within the component cannot be called directly from other components. All calls are through the well-defined API.

Components can be statically compiled or compiled as individually loadable units (shared objects, Dynamic Link Libraries (DLLs), or other dynamically loadable compiled code).

The components of a single DFD find each other through a variety of means:

Command-line parameters identifying/associating components together

Broadcast protocol (with relays as necessary) allowing components to find each other.

Intricate Intertwining

Figure 27:
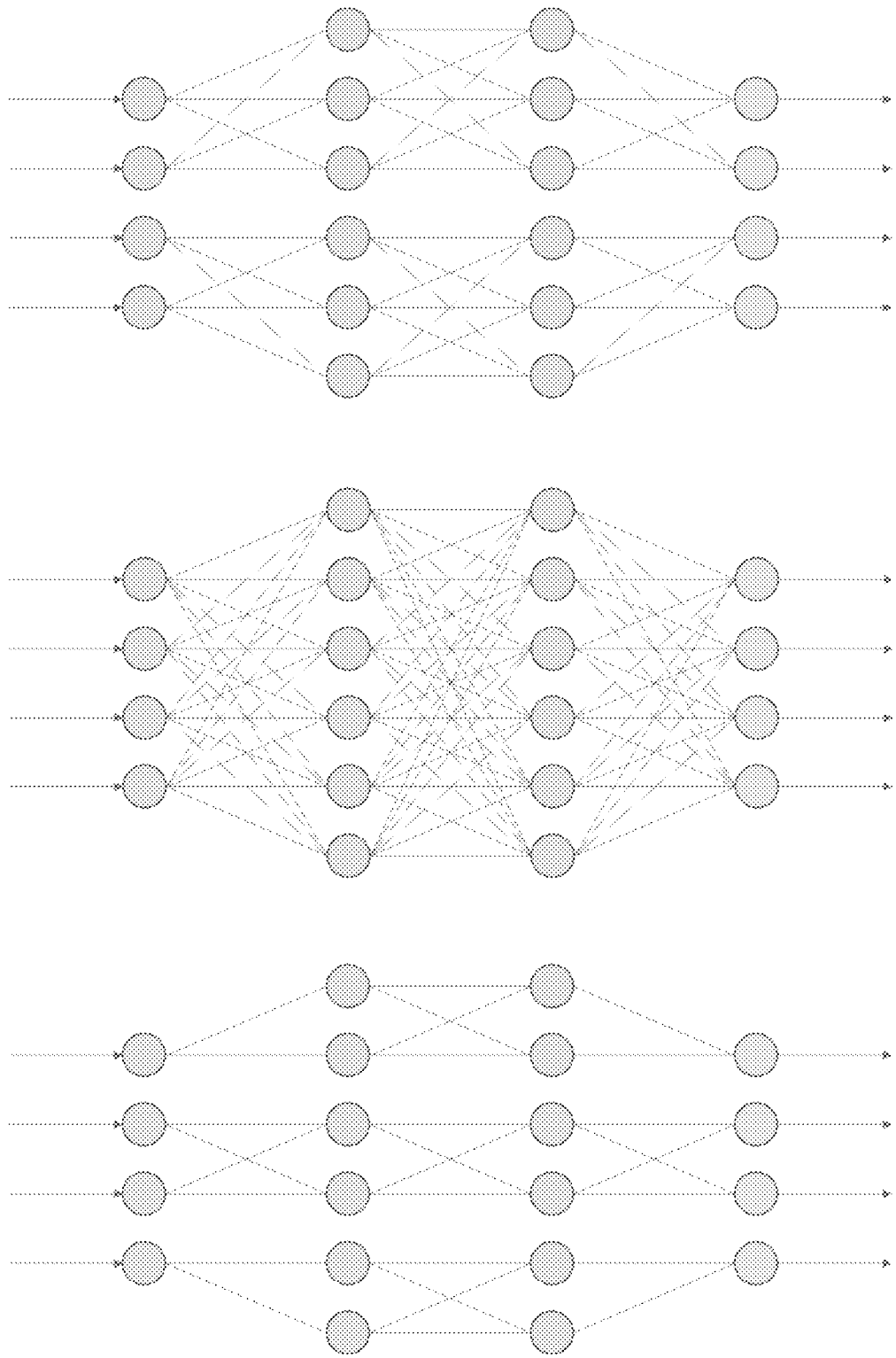
FIG. 27 is three interconnection diagrams of controllers to describe intricate intertwining therebetween.

FIG. 27 is three interconnection diagrams of controllers to describe intricate intertwining therebetween. Specifically, a pair of neural nets are illustrated at the top, followed by intricate intertwining in the middle, followed by un-intertwining at the bottom. Again, in the larger forms of SDIDA, the SDIDA complex has many SDIDA and hence many learning engines. A pair of SDIDA may be communicating in abstraction about the results of their learning (top) but then may choose (as SDIDA is self-arranging, etc.) to merge their learning engines (middle).

In an example embodiment, the controllers can be used to form a distributed Path Computation Engine (PCE). Here, the domains include different networks, under different controllers, and the start of a service in one domain may not know the destinations in the other domains. The intertwining occurs at the handoffs between each controller between each domain. Other embodiments are also contemplated.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include one or more processors to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, the software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A controller associated with a domain, the controller comprising:
a network interface;
one or more processors communicatively coupled to the network interface; and
memory storing instructions that, when executed, cause the one or more processors to
communicate with one or more additional controllers via the network interface, wherein each of the one or more additional controllers is in one or more additional domains, wherein each domain has one or more resources including one or more of connect resources, storage resources, and compute resources, and wherein each domain provides different characteristics,
utilize at least part of a control pattern to obtain requirements for a service, and
cause, utilizing any of a peer relationship and a hierarchical relationship with the one or more additional controllers, at least part of implementation of a composition of resources to meet the requirements for the service, wherein the composition defines the resources provided in each domain for the service, and wherein the composition is based on the requirements and the different characteristics in each domain,
wherein the control pattern of the controller interacts with a second control pattern of at least one of the additional controllers in a competing manner, where each controller maintains information about its contribution to the composition including performance indicators.

2. The controller of claim 1, wherein a relationship between the controller and at least one of the additional controllers is at a dynamically varying intricacy level that indicates a detail of information exchange therebetween.

3. The controller of claim 1, wherein at least one of the resources implement at least part of a control pattern therewithin.

4. The controller of claim 1, wherein the controller acts in a co-operative manner with at least one of the additional controllers, where each controller maintains information about its contribution to the composition including performance indicators.

5. The controller of claim 1, wherein the controller and the one or more additional controllers are each included in a node of a plurality of nodes, and wherein the plurality of nodes are assembled into a self-assembling network to implement the composition that includes a geographic distribution of the plurality of nodes, and is based on the requirements which include one or more of latency and jitter.

6. The controller of claim 5, wherein the nodes are data centers, including any of terrestrial data centers, non-terrestrial data centers, and combinations thereof.

7. The controller of claim 5, wherein the nodes are flying devices, and the implementation of the composition involves a rearrangement of the flying nodes.

8. The controller of claim 1, wherein the controller interacts with the additional controllers to form a controller complex that self-assembles, self-regulates, and self-optimizes.

9. The controller of claim 1, wherein the control pattern utilizes a connectivity graph between the plurality of resources and performance indicators related to connectivity and capability of the plurality of resources, to determine the composition, and wherein the controller and the additional controllers participate in a distributed search of the connectivity graph.

10. The controller of claim 1, wherein each domain includes one or more disparate devices that communicate with the controller via open Application Programming Interfaces (APIs) and shared information models.

11. The controller of claim 1, wherein each domain is one of different ecosystem types and/or spans commercial boundaries.

12. The controller of claim 1, wherein at least part of the control pattern utilizes Machine Intelligence techniques.

13. A controller associated with a domain, the controller comprising:
   a network interface;
   one or more processors communicatively coupled to the network interface; and
   memory storing instructions that, when executed, cause the one or more processors to
      communicate with one or more additional controllers via the network interface, wherein each of the one or more additional controllers is in one or more additional domains, wherein each domain has one or more resources including one or more of connect resources, storage resources, and compute resources, and wherein each domain provides different characteristics,
      utilize at least part of a control pattern to obtain requirements for a service, and
      cause, utilizing any of a peer relationship and a hierarchical relationship with the one or more additional controllers, at least part of implementation of a composition of resources to meet the requirements for the service, wherein the composition defines the resources provided in each domain for the service, and wherein the composition is based on the requirements and the different characteristics in each domain,
      wherein the peer or hierarchical relationship with at least one of the additional controllers is formed dynamically through discovery and attachment.

14. The controller of claim 13, wherein the controller acts in a co-operative manner with at least one of the additional controllers, where each controller maintains information about its contribution to the composition including performance indicators.

15. The controller of claim 13, wherein at least part of the control pattern utilizes Machine Intelligence techniques.

16. The controller of claim 13, wherein the controller and the one or more additional controllers are each included in a node of a plurality of nodes, and wherein the nodes are data centers, including any of terrestrial data centers, non-terrestrial data centers, and combinations thereof.

17. The controller of claim 13, wherein the controller and the one or more additional controllers are each included in a node of a plurality of nodes, and wherein the nodes are flying devices, and the implementation of the composition involves a rearrangement of the flying nodes.

18. A controller associated with a domain, the controller comprising:
   a network interface;
   one or more processors communicatively coupled to the network interface; and
   memory storing instructions that, when executed, cause the one or more processors to
      communicate with one or more additional controllers via the network interface, wherein each of the one or more additional controllers is in one or more additional domains, wherein each domain has one or more resources including one or more of connect resources, storage resources, and compute resources, and wherein each domain provides different characteristics,
      utilize at least part of a control pattern to obtain requirements for a service, and
      cause, utilizing any of a peer relationship and a hierarchical relationship with the one or more additional controllers, at least part of implementation of a composition of resources to meet the requirements for the service, wherein the composition defines the resources provided in each domain for the service, and
      wherein an element of the control pattern includes at least part of a second control pattern embedded within to refine the element.

19. The controller of claim 18, wherein the controller interacts with the additional controllers to form a controller complex that self-assembles, self-regulates, and self-optimizes.

20. The controller of claim 18, wherein each domain is one of different ecosystem types and/or spans commercial boundaries.

21. The controller of claim 18, wherein the controller and the one or more additional controllers are each included in a node of a plurality of nodes, and wherein the nodes are data centers, including any of terrestrial data centers, non-terrestrial data centers, and combinations thereof.

22. The controller of claim 18, wherein the controller and the one or more additional controllers are each included in a node of a plurality of nodes, and wherein the nodes are flying devices, and the implementation of the composition involves a rearrangement of the flying nodes.

23. A controller associated with a domain, the controller comprising:
   a network interface;
   one or more processors communicatively coupled to the network interface; and
   memory storing instructions that, when executed, cause the one or more processors to
      communicate with one or more additional controllers via the network interface, wherein each of the one or more additional controllers is in one or more additional domains, wherein each domain has one or more resources including one or more of connect resources, storage resources, and compute resources, and wherein each domain provides different characteristics,
      utilize at least part of a control pattern to obtain requirements for a service, and
      cause, utilizing any of a peer relationship and a hierarchical relationship with the one or more additional controllers, at least part of implementation of a composition of resources to meet the requirements for the service, wherein the composition defines the resources provided in each domain for the service, and
      wherein the controller initiates instantiation of at least one additional controller to form a controller complex.

24. The controller of claim 23, wherein the controller and the one or more additional controllers are each included in a node of a plurality of nodes, and wherein the nodes are data centers, including any of terrestrial data centers, non-terrestrial data centers, and combinations thereof.

25. The controller of claim 23, wherein the controller and the one or more additional controllers are each included in a node of a plurality of nodes, and wherein the nodes are flying devices, and the implementation of the composition involves a rearrangement of the flying nodes.

26. The controller of claim 23, wherein each domain includes one or more disparate devices that communicate with the controller via open Application Programming Interfaces (APIs) and shared information models.

* * * * *